US011607051B2

(12) United States Patent
Natuzzi

(10) Patent No.: US 11,607,051 B2
(45) Date of Patent: Mar. 21, 2023

(54) CONVERTIBLE FURNITURE ARRANGEMENT FOR A RECREATIONAL VEHICLE

(71) Applicant: Triple E Canada, Ltd., Winkler (CA)

(72) Inventor: Angelo Natuzzi, Winkler (CA)

(73) Assignee: Triple E Canada, Ltd., Winkler (CA)

( * ) Notice: Subject to any disclaimer, the term of this patent is extended or adjusted under 35 U.S.C. 154(b) by 0 days.

(21) Appl. No.: 17/372,804

(22) Filed: Jul. 12, 2021

(65) Prior Publication Data

US 2023/0011830 A1     Jan. 12, 2023

(51) Int. Cl.
*A47C 19/22* (2006.01)
*A47B 83/02* (2006.01)
*A47B 83/04* (2006.01)
*B60N 3/00* (2006.01)
*B60P 3/39* (2006.01)
*A47C 17/30* (2006.01)
*B60P 3/34* (2006.01)
*B61D 1/08* (2006.01)

(52) U.S. Cl.
CPC .............. *A47C 19/22* (2013.01); *A47B 83/02* (2013.01); *A47B 83/04* (2013.01); *A47C 17/30* (2013.01); *B60N 3/008* (2013.01); *B60P 3/34* (2013.01); *B60P 3/39* (2013.01); *B61D 1/08* (2013.01)

(58) Field of Classification Search
CPC ......... A47C 19/22; A47C 17/30; A47C 17/38; A47C 13/00; A47B 83/02; A47B 83/04; A47B 830/23; A47B 830/0213; A47B 2200/0071; B60N 3/008; B60N 2/0292; B60P 3/39; B60P 3/34; B61D 1/08; E04B 2002/7483

USPC ........ 297/63, 67, 112, 119, 121, 354.1, 233, 297/118, 128.2, 158.1; 5/2.1; 296/69
See application file for complete search history.

(56) References Cited

U.S. PATENT DOCUMENTS

| 276,748 A | 5/1883 | Baldwin |
| 817,596 A | 4/1906 | Siebenthal |
| 1,385,317 A | 7/1921 | Dyer |

(Continued)

OTHER PUBLICATIONS

Screen captures from YouTube video clip entitled "Full Review | 2020 Tiffin Wayfarer 25RW | Class C RV With a Massive Slideout" 13 pages, posted on Jul. 4, 2019. Visited on Jun. 9, 2021. https://www.youtube.com/watch?v=4tn2gGTB4L8.

*Primary Examiner* — Robert Canfield
(74) *Attorney, Agent, or Firm* — Faegre Drinker Biddle & Reath LLP

(57) ABSTRACT

A convertible furniture arrangement for a living quarters is provided. The convertible furniture arrangement includes a slide-out structure. The slide-out structure is adapted to move relative to the wall and the floor of the living quarters, and the slide-out structure includes a rear wall. A first seat assembly is carried by the slide-out structure and includes a first seat bottom. A second seat assembly is carried by the slide-out structure and spaced apart from the first seat assembly, and the second seat assembly includes a second seat bottom. A bed assembly is pivotably carried by the slide-out structure. The bed assembly includes a base and a mattress supported by the base. In a seating mode, the bed assembly is disposed between the seat assemblies and the rear wall. In a bed mode, the bed assembly overlies the seat bottoms.

41 Claims, 19 Drawing Sheets

(56) References Cited

U.S. PATENT DOCUMENTS

| | | | |
|---|---|---|---|
| 1,426,463 A * | 8/1922 | Coopersmith | A47C 17/48 5/2.1 |
| 1,725,438 A | 8/1929 | Brand | |
| 1,768,520 A | 6/1930 | Anderson | |
| 2,544,980 A * | 3/1951 | Brown | B61D 1/04 105/315 |
| 2,777,742 A | 1/1957 | Schieber | |
| 3,133,510 A | 5/1964 | Maraventano | |
| 3,866,547 A | 2/1975 | Guyton | |
| 4,318,195 A * | 3/1982 | Reppas | A47C 17/62 5/2.1 |
| 4,815,785 A | 3/1989 | Goodall et al. | |
| 4,862,611 A | 9/1989 | Wright | |
| 5,088,135 A * | 2/1992 | Violette | B60P 3/36 5/8 |
| 5,136,737 A * | 8/1992 | Reppas | A47C 17/04 5/162 |
| 5,197,776 A * | 3/1993 | Brown | B60P 3/38 296/65.03 |
| 5,788,324 A | 8/1998 | Shea et al. | |
| 6,098,346 A * | 8/2000 | Miller | B60P 3/36 296/22 |
| 6,441,576 B1 | 8/2002 | Marin-Martinod et al. | |
| 6,929,321 B1 * | 8/2005 | Shrock | A47C 17/80 297/188.1 |
| 7,399,031 B2 * | 7/2008 | Gardner | B60P 3/36 297/118 |
| 7,896,432 B2 * | 3/2011 | Dunkel | B60N 3/001 297/125 |
| 8,424,132 B2 * | 4/2013 | Stimel | B60N 2/34 5/118 |
| 9,174,556 B2 | 11/2015 | Yin et al. | |
| 10,029,602 B1 * | 7/2018 | Spickler | B60P 3/39 |
| 10,154,730 B2 | 12/2018 | Natuzzi | |
| 10,513,205 B2 * | 12/2019 | Nasiri | B64D 11/0604 |
| 10,611,282 B2 | 4/2020 | Natuzzi | |
| 10,835,047 B2 * | 11/2020 | Dimitrov | A47C 17/86 |
| RE48,344 E * | 12/2020 | Weiland | A47C 7/5068 |
| 2004/0160074 A1 * | 8/2004 | Shea | B60P 3/34 296/26.13 |
| 2004/0239135 A1 | 12/2004 | Mehrer | |
| 2010/0140010 A1 * | 6/2010 | Hollenbeck | B62D 33/0612 297/63 |
| 2010/0264791 A1 * | 10/2010 | Rajeswaran | A47B 83/00 312/330.1 |
| 2011/0023230 A1 * | 2/2011 | Colombo | A47C 17/38 5/43 |
| 2012/0131745 A1 * | 5/2012 | Wieland | A47C 17/62 5/2.1 |
| 2013/0119738 A1 | 5/2013 | Wallis | |
| 2013/0241246 A1 * | 9/2013 | Round | B64D 11/0606 297/63 |
| 2014/0246963 A1 | 9/2014 | Elizondo et al. | |
| 2017/0197537 A1 * | 7/2017 | Gerzeny | B60P 3/34 |
| 2019/0116974 A1 | 4/2019 | Natuzzi | |
| 2020/0170415 A1 * | 6/2020 | Broussard | A47C 17/165 |
| 2021/0031659 A1 | 2/2021 | Natuzzi | |
| 2021/0037983 A1 * | 2/2021 | Marjadsingh | A47C 17/38 |
| 2021/0353072 A1 * | 11/2021 | Aldrich | B60N 3/008 |

* cited by examiner ly, it is desir-
CONVERTIBLE FURNITURE ARRANGEMENT FOR A RECREATIONAL VEHICLE

TECHNICAL FIELD OF THE DISCLOSURE

The present disclosure relates to a convertible furniture arrangement for a living quarters, such as a recreational vehicle. More specifically, the present disclosure relates to a convertible seating, dining, and sleeping arrangement for a slide-out room of a recreational vehicle.

BACKGROUND OF THE DISCLOSURE

In confined living quarters, such as recreational vehicles, space is limited and at a premium. Accordingable if structures can be rearranged to facilitate more than one activity. For example, it has been known to provide dinette arrangements which may be convertible to provide other types of seating arrangements. Further improvements would greatly enhance the usefulness of such convertible furniture arrangements in confined living quarters.

SUMMARY

In an exemplary embodiment of the present disclosure, a convertible furniture arrangement for a living quarters is provided. The living quarters includes a wall and a floor. The convertible furniture arrangement includes a first seat assembly, a second seat assembly, and a bed assembly. The first seat assembly includes a first seat bottom. The second seat assembly is spaced apart from the first seat assembly, and the second seat assembly includes a second seat bottom. The bed assembly is pivotable relative to the first seat assembly and the second seat assembly. The bed assembly includes a base and mattress supported by the base. The mattress includes a body portion having a first laying surface and a foot portion that is movable relative to the body portion. The foot portion has a second laying surface. The mattress is convertible from a stacked configuration to an unstacked configuration. In the stacked configuration, the foot portion overlies the body portion. In the unstacked configuration, the second laying surface of the foot portion is substantially coplanar with the first laying surface of the body portion. The convertible furniture arrangement is convertible from a seating mode to a bed mode. In the seating mode, the bed assembly is disposed apart from the first seat assembly and the second seat assembly. In the bed mode, the bed assembly overlies the first seat bottom and the second seat bottom and the mattress is disposed in the unstacked configuration.

In an example thereof, the base includes a main portion and a secondary portion is pivotable relative to the main portion from a folded configuration to an unfolded configuration. In the folded configuration, the secondary portion is substantially perpendicular to the main portion. In the unfolded configuration, the secondary portion is substantially coplanar with the main portion. In the bed mode, the base is disposed in the unfolded configuration.

In another example thereof, in the folded configuration the secondary portion is disposed aside the foot portion and inhibits the mattress from converting from the stacked configuration to the unstacked configuration. In the unfolded configuration, the secondary portion permits the mattress to convert from the stacked configuration to the unstacked configuration.

In another example thereof, the furniture arrangement further includes a support that is pivotable relative to the bed assembly. In the seating mode, the support is disposed above the first seat assembly and the second seat assembly. In the bed mode, the support is adapted to abut the floor.

In another example thereof, the furniture arrangement further includes a table assembly that is movable relative to the first seat assembly and the second seat assembly from an elevated configuration to a lowered configuration.

In another example thereof, in the bed mode the table assembly is disposed in the lowered configuration and the bed assembly overlies the table assembly.

In another example thereof, the furniture arrangement further includes a third seat bottom that is supportable by the table assembly in the lowered configuration to provide the convertible furniture arrangement with a sofa mode.

In another example thereof, the first seat bottom includes a first seating surface, the second seat bottom includes a second seating surface, and the third seat bottom includes a third seating surface. In the sofa mode, the third seating surface is substantially coplanar with the first seating surface and the second seating surface.

In another example thereof, the first seat assembly further includes a first seat back, the second seat assembly further includes a second seat back. The first seat back and the second seat back are detachable relative to the first seat bottom and the second seat bottom, respectively, to facilitate positioning the bed assembly over the first seat bottom and the second seat bottom in the bed mode.

In another example thereof, the first seat back and the second seat back are movable relative to the first seat bottom and the second seat bottom, respectively, to provide the convertible furniture arrangement with a forward-facing seating mode and a transverse-facing seating mode.

In another example thereof, the first seat back and the second seat back detachably couple to the base in the forward-facing seating mode.

In another exemplary embodiment of the present disclosure, a convertible furniture arrangement for a living quarters is provided. The living quarters includes a wall and a floor. The convertible furniture arrangement includes a slide-out structure, a first seat assembly, a second seat assembly, and a bed assembly. The slide-out structure is adapted to move relative to the wall and the floor of the living quarters, and the slide-out structure includes a rear wall. The first seat assembly is carried by the slide-out structure and includes a first seat bottom. The second seat assembly is carried by the slide-out structure and spaced apart from the first seat assembly, and the second seat assembly includes a second seat bottom. The bed assembly is pivotably carried by the slide-out structure. The bed assembly includes a base and a mattress supported by the base. The convertible furniture arrangement is convertible from a seating mode to a bed mode. In the seating mode, the bed assembly is disposed between the first seat assembly and the rear wall and between the second seat assembly and the rear wall. In the bed mode, the bed assembly overlies the first seat bottom and the second seat bottom.

In an example thereof, the mattress includes a body portion and a foot portion that is movable relative to the body portion. The mattress is convertible from a stacked configuration to an unstacked configuration. In the stacked configuration, the foot portion overlies the body portion. In the unstacked configuration, a laying surface of the foot portion is substantially coplanar with a laying surface of the body portion. In the bed mode, the mattress is disposed in the unstacked configuration.

In another example thereof, the base includes a main portion and a secondary portion that is pivotable relative to the main portion. The base is convertible from a folded configuration to an unfolded configuration. In the folded configuration, the secondary portion is substantially perpendicular to the main portion. In the unfolded configuration, the secondary portion is substantially coplanar with the main portion. In the bed mode, the base is disposed in the unfolded configuration.

In another example thereof, the arrangement further includes a support that is pivotable relative to the bed assembly. In the seating mode, the support is disposed above the first seat assembly and the second seat assembly. In the bed mode, the support is adapted to abut the floor.

In another example thereof, the arrangement further includes a table assembly that is movable relative to the first seat assembly and the second seat assembly from an elevated configuration to a lowered configuration.

In another example thereof, in the bed mode the table assembly is disposed in the lowered configuration and the bed assembly overlies the table assembly.

In another example thereof, the first seat assembly further includes a first seat back, the second seat assembly further includes a second seat back. The first seat back and the second seat back are detachable relative to the first seat bottom and the second seat bottom, respectively, to facilitate positioning the bed assembly over the first seat bottom and the second seat bottom in the bed mode.

In another example thereof, the arrangement further includes a head portion fixed relative to the rear wall. The head portion is disposed between the rear wall and the mattress.

In another example thereof, in the bed mode a laying surface of the mattress is substantially coplanar with a laying surface of the head portion.

In yet another exemplary embodiment of the present disclosure, a convertible furniture arrangement for a living quarters is provided. The living quarters includes a wall and a floor. The convertible furniture arrangement includes a first seat assembly having a first seat bottom, a second seat assembly spaced apart from the first seat assembly, and the second seat assembly having a second seat bottom. A bed assembly is pivotable relative to the first seat assembly and the second seat assembly. The bed assembly includes a base, and the base has a main portion and a secondary portion that is pivotable relative to the main portion. The base is convertible from a folded configuration to an unfolded configuration. In the folded configuration, the secondary portion is substantially perpendicular to the main portion. In the unfolded configuration, the secondary portion is substantially coplanar with the main portion. The convertible furniture arrangement is convertible from a seating mode to a bed mode. In the seating mode, the bed assembly is disposed apart from the first seat assembly and the second seat assembly. In the bed mode, the bed assembly overlies the first seat bottom and the second seat bottom and the base is disposed in the unfolded configuration.

In an example thereof, the convertible furniture arrangement further includes a slide-out structure adapted to move relative to the wall and the floor of the living quarters. The slide out structure carries the first seat assembly, the second seat assembly, and the bed assembly.

In another example thereof, the convertible furniture arrangement further includes a table assembly that is movable relative to the first seat assembly and the second seat assembly from an elevated configuration to a lowered configuration.

In another example thereof, in the bed mode the table assembly is disposed in the lowered configuration and the bed assembly overlies the table assembly.

In another example thereof, the arrangement further includes a retainer coupled to the bed assembly, the retainer being engagable to inhibit the bed assembly from converting from the bed mode to the seating mode.

In another example thereof, the retainer is engagable by converting the base from the folded configuration to the unfolded configuration.

In another example thereof, the retainer includes a leg that is translatable relative to the main portion of the base and coupled to the secondary portion, and a strike plate that is configured to receive the leg when the base is configured in the unfolded configuration. The retainer thereby inhibits the bed assembly from converting from the bed mode to the seating mode.

Additional features and advantages will become apparent to those skilled in the art upon consideration of the following detailed description.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
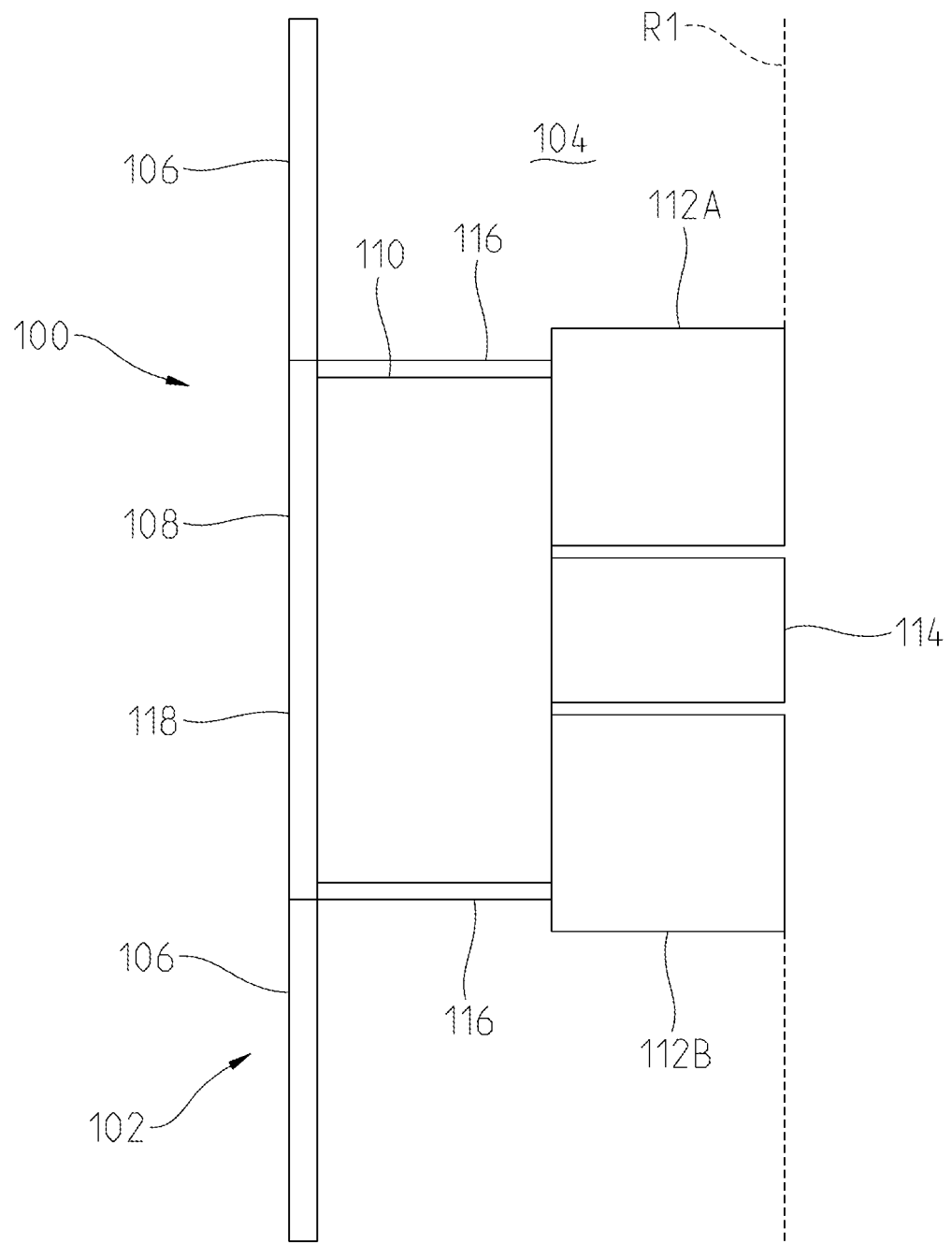
FIG. 1 schematically illustrates an embodiment of a convertible furniture arrangement according to the present disclosure in a retracted configuration.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In some instances throughout this disclosure and in the claims, numeric terminology, such as first, second, third, and fourth, is used in reference to various components, inputs, and other items. Such use is not intended to denote an ordering of the components. Rather, numeric terminology is used to assist the reader in identifying the component being referenced and should not be narrowly interpreted as providing a specific order of components.

Figure 2:
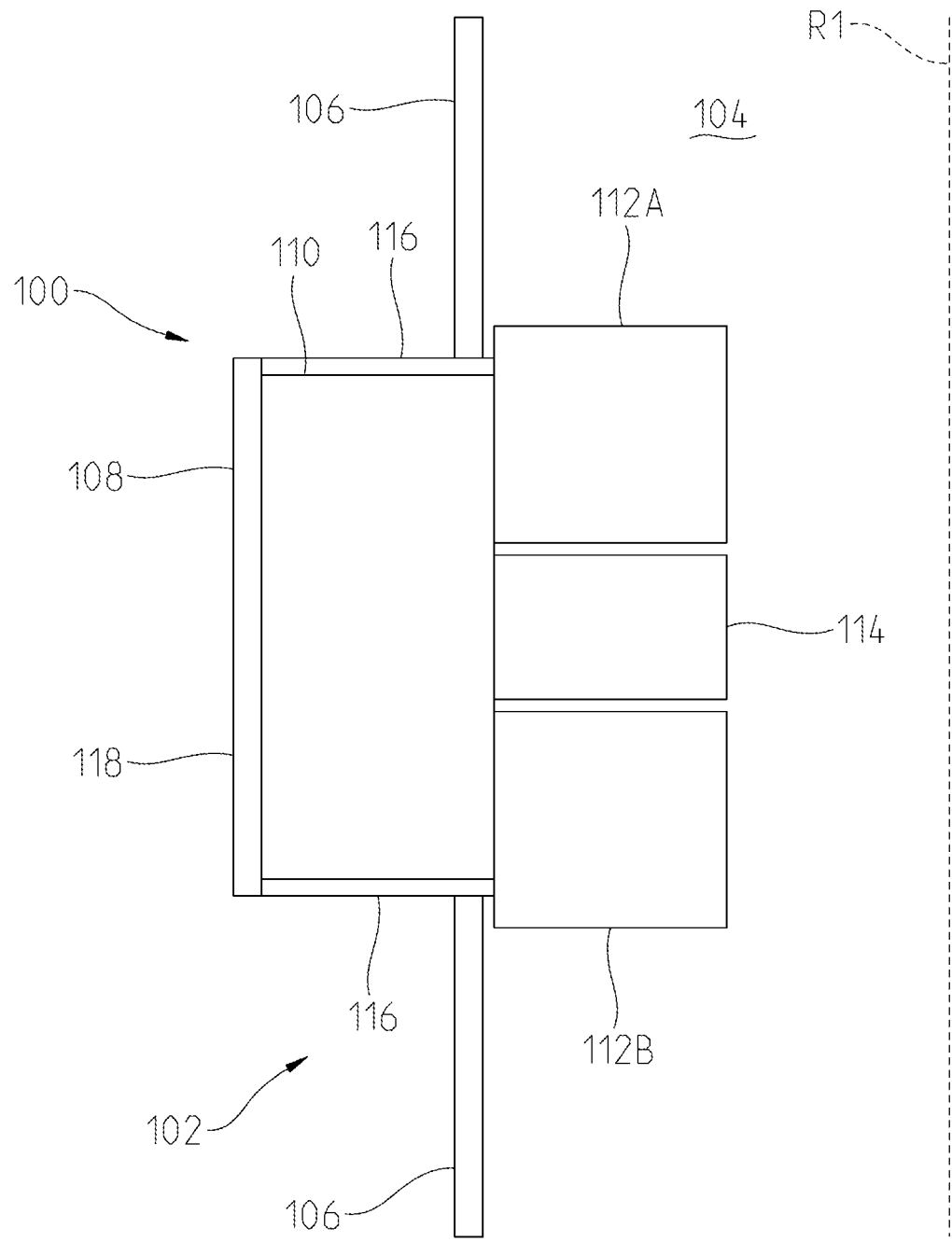
FIG. 2 schematically illustrates the convertible furniture arrangement of FIG. 1 in an extended configuration and a seating mode.
Figure 3:
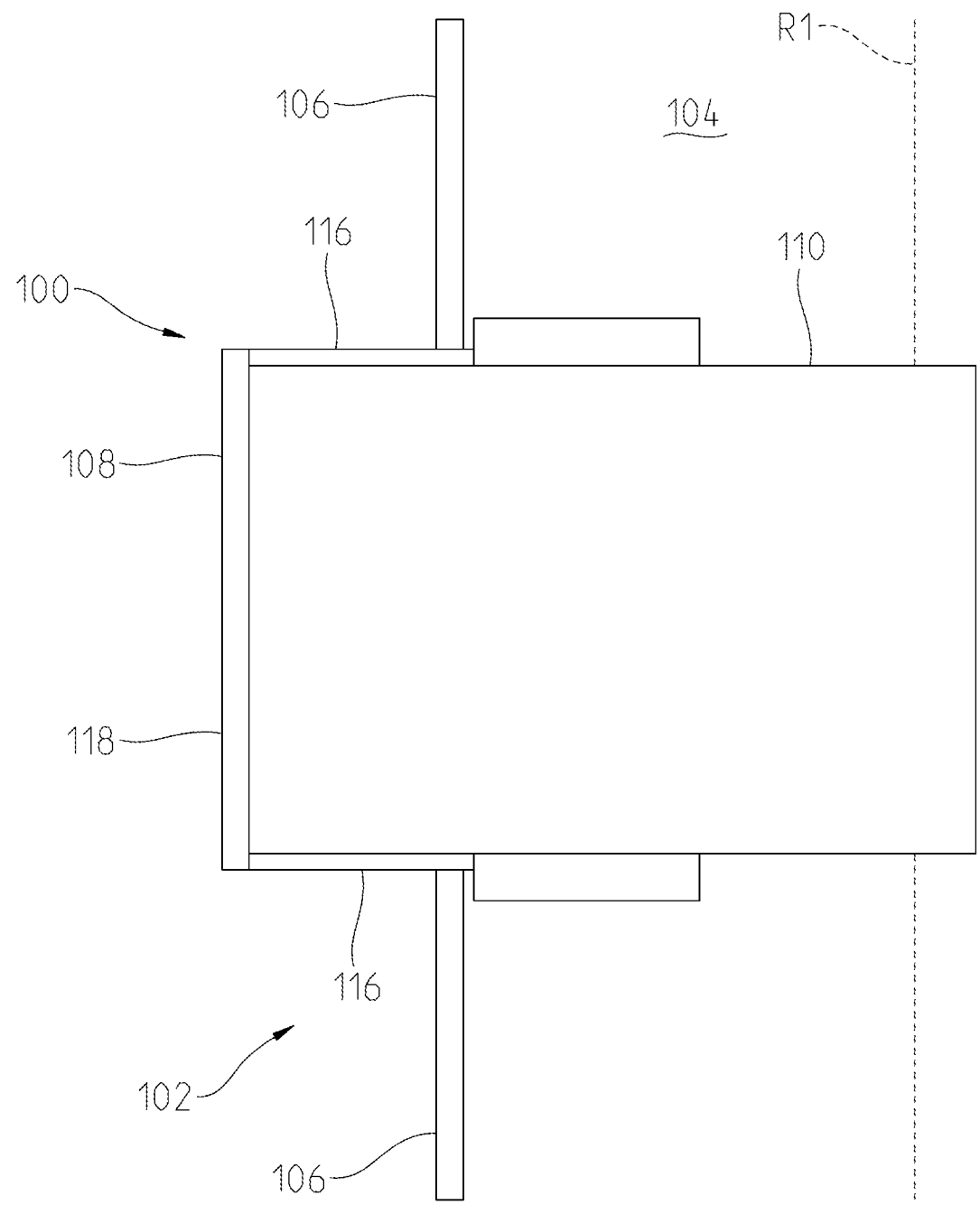
FIG. 3 schematically illustrates the convertible furniture arrangement of FIG. 1 in the extended configuration and a bed mode.

FIGS. 1-3 schematically illustrate an embodiment of a convertible furniture arrangement 100 according to the present disclosure. The convertible furniture arrangement 100 is positioned in a living quarters 102, which may be, for example, a recreational vehicle. The living quarters 102 may include, for example, a floor 104, one or more walls 106, and a ceiling (not shown). In some embodiments and as illustrated, the convertible furniture arrangement 100 includes, or is constructed together with, a slide-out structure or "room" 108 of the living quarters 102. As a result, the convertible furniture arrangement 100 is movable relative the walls 106 and the floor 104 of the living quarters 102 from a retracted configuration (FIG. 1) to an extended configuration (FIG. 2) and vice versa. The convertible furniture arrangement 100 may occupy the retracted configuration during travel of the living quarters 102. The convertible furniture arrangement 100 may occupy the extended configuration when the living quarters 102 is stationary to increase its volume. The living quarters 102 may include one or more actuators (not shown—for example, electric motors, hydraulic pistons, and the like) for moving the convertible furniture arrangement 100 relative the walls 106 and the floor 104.

The convertible furniture arrangement 100 also includes a bed assembly 110, which may also be referred to as a Murphy bed assembly, a first chair assembly 112A, a second chair assembly 112B, and a table assembly 114 that are carried by the slide-out structure 108. These assemblies are convertible to provide the convertible furniture arrangement 100 with various modes suitable for different activities. For example and referring to FIG. 2, in the extended configuration the convertible furniture arrangement 100 may occupy a seating mode. In the seating mode, as the name implies, the first seat assembly 112A and the second seat assembly 112B may each support one or more occupants in seated postures. In the seating mode, the bed assembly 110 is stored behind the seat assemblies 112A, 112B and within the slide-out structure 108. As another example and referring to FIG. 3, in the extended configuration the convertible furniture arrangement 100 may occupy a bed mode. In the bed mode, the bed assembly 110 is disposed above the first seat assembly 112A, the second seat assembly 112B, and the table assembly 114 and may support one or more occupants in laying postures.

Illustratively, the slide-out structure 108 includes an open box-like shape. More specifically, the slide-out structure 108 includes side walls 116, a rear wall 118, a floor (shown elsewhere), and a ceiling (shown elsewhere). In other embodiments, the slide-out structure 108 may have other shapes.

With general reference again to FIGS. 1-3, the convertible furniture arrangement 100 is convertible between a relatively compact size and a relatively large size. More specifically, in some embodiments and as illustrated in FIG. 1, in the retracted configuration the convertible furniture arrangement 100 has a first depth. Stated another way, the convertible furniture arrangement 100 extends from the walls 106 of the living quarters 102 to a reference line R1 disposed apart from the walls 106. As illustrated in FIG. 3, in the extended configuration and the bed mode the convertible furniture arrangement 100 has a second, larger depth. Stated another way, in the extended configuration and the bed mode the convertible furniture arrangement 100 extends beyond both the walls 106 of the living quarters 102 and the reference line R1.

FIGS. 4-17 further illustrate the convertible furniture arrangement 100 disposed in, and being converted to, various modes. In FIGS. 4-17, the living quarters 102 is omitted so that features of the convertible furniture arrangement 100 are visible. However, it is understood that the convertible furniture arrangement 100, as illustrated in FIGS. 4-17, could be in the extended configuration or the retracted configuration relative to the living quarters 102.

Figure 4:
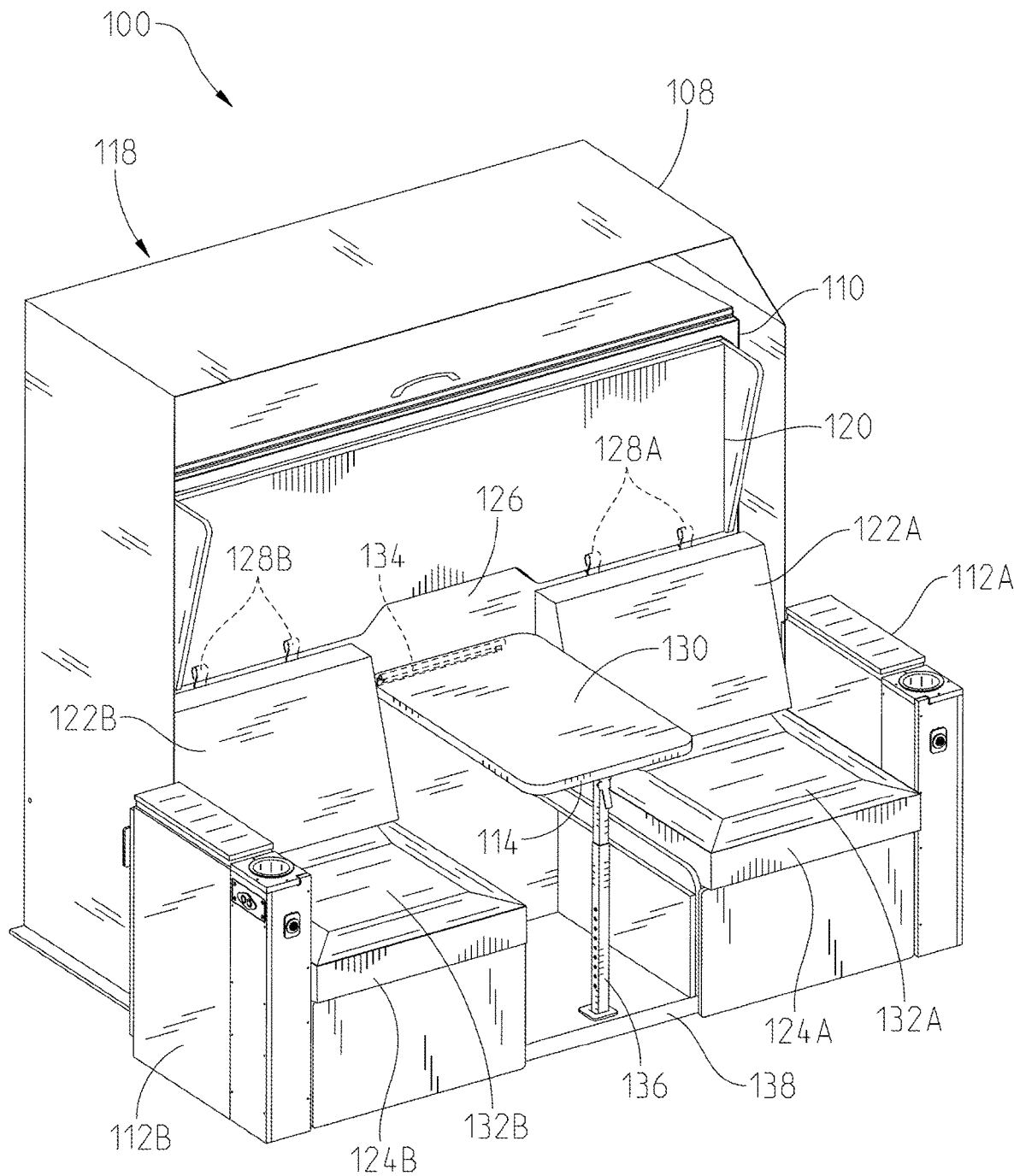
FIG. 4 illustrates a top perspective view of the convertible furniture arrangement of FIG. 1 in a non-reclined seating mode.

FIG. 4 illustrates the convertible furniture arrangement 100 in a seating mode. More specifically, FIG. 4 illustrates the convertible furniture arrangement 100 in a mode in which the first seat assembly 112A and the second seat assembly 112B are not reclined. Stated another way, FIG. 4 specifically illustrates the convertible furniture arrangement 100 in a non-reclined seating mode.

In the non-reclined seating mode, the first seat assembly 112A, the second seat assembly 112B, the bed assembly 110, and the table assembly 114 may be disposed as follows. The bed assembly 110 is disposed apart from the first seat assembly 112A and the second seat assembly 112B. More specifically, the bed assembly 110 is folded and disposed between the seat assemblies 112A, 112B and the rear wall 118 of the slide-out structure 108. Even more specifically, the bed assembly 110 is folded and stowed within the slide-out structure 108. A support 120 of the bed assembly 110 is disposed above the first seat assembly 112A and the second seat assembly 112B.

In the non-reclined seating mode, a first seat back, or back cushion, 122A of the first seat assembly 112A is disposed on top of a first seat bottom, or bottom cushion, 124A of the first seat assembly 112A. In addition, the first seat back 122A is disposed adjacent and detachably couples to a base 126 of the bed assembly 110 (for example, via snap connectors 128A). Similarly, the second seat back, or back cushion, 122B of the second seat assembly 112B is disposed on top of a second seat bottom, or bottom cushion, 124B of the second seat assembly 112B. In addition, the second seat back 122B is disposed adjacent and detachably couples to the base 126 of the bed assembly 110 (for example, via snap connectors 128B). Due to the positioning of the first seat back 122A and the second seat back 122B, occupants seated on the seat bottoms 124A, 124B may face away from the bed assembly 110. As such, the non-reclined seating mode illustrated in FIG. 4 may more specifically be referred to as a forward-facing non-reclined seating mode.

In the non-reclined seating mode, the table assembly 114 is disposed in an elevated configuration. More specifically, an upper or table surface 130 of the table assembly 114 is disposed above an upper or seating surface 132A of the first seat bottom 124A and an upper or seating surface 132B of the second seat bottom 124B. The table assembly 114 is detachably supported an upper bracket 134 carried by the base 126 of the bed assembly 110. The table assembly 114 is also supported by a convertible leg 136 that abuts a floor 138 of the slide-out structure 110.

Figure 5:
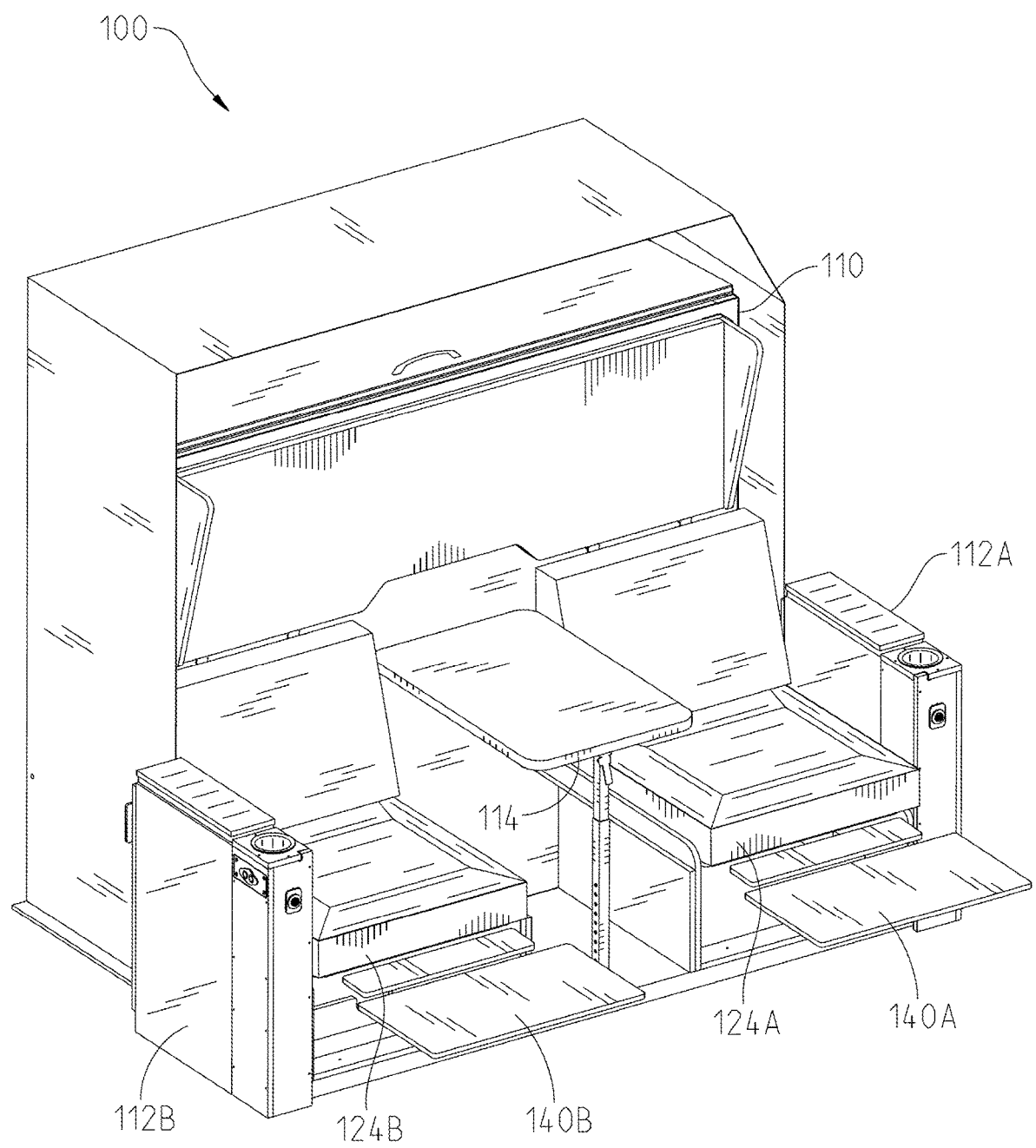
FIG. 5 illustrates a top perspective view of the convertible furniture arrangement of FIG. 1 in a reclined seating mode.

FIG. 5 illustrates the convertible furniture arrangement 100 in another forward-facing seating mode. More specifically, FIG. 5 illustrates the convertible furniture arrangement 100 in a mode in which the first seat assembly 112A and the second seat assembly 112B are reclined. Stated another way, FIG. 5 specifically illustrates the convertible furniture arrangement 100 in a reclined seating mode.

In the reclined seating mode, the first seat assembly 112A, the second seat assembly 112B, the bed assembly 110, and the table assembly 114 may generally be disposed as described above in connection with the non-reclined seating mode illustrated in FIG. 4. In the reclined seating mode, however, a first footrest 140A of the first seat assembly 112A is elevated relative to the first seat bottom 124A. Similarly, a second footrest 140B of the second seat assembly 112B is elevated relative to the second seat bottom 124B. Recliners (not shown) movably coupling the first footrest 140A and the second footrest 140B to the first seat bottom 124A and the second seat bottom 124B, respectively, may take any form known in the art.

Figure 6:
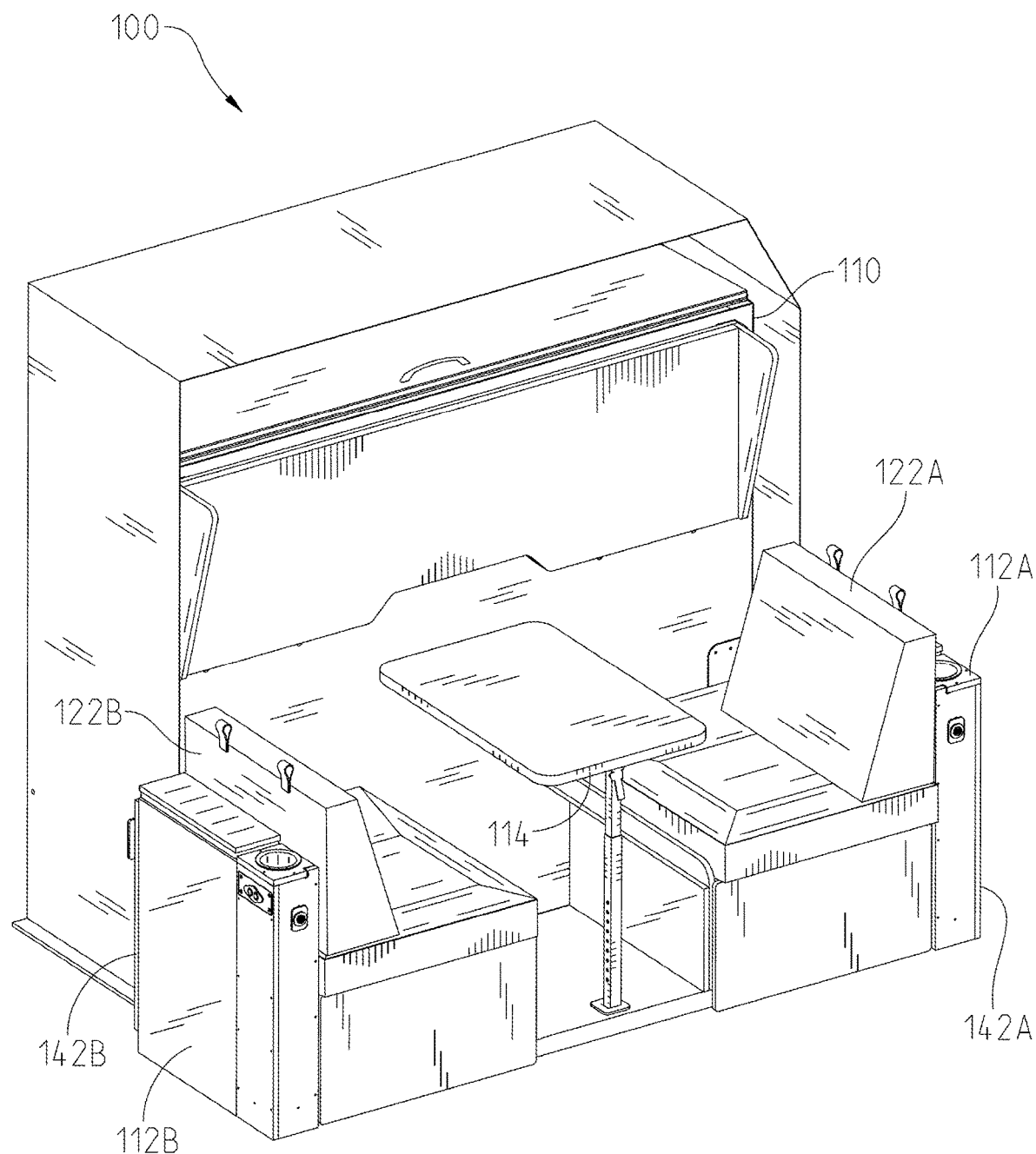
FIG. 6 illustrates a top perspective view of the convertible furniture arrangement of FIG. 1 in a dinette mode.

FIG. 6 illustrates the convertible furniture arrangement 100 in a dinette or dining mode. In the dinette mode, the first seat assembly 112A, the second seat assembly 112B, the bed assembly 110, and the table assembly 114 may generally be disposed as described above in connection with the non-reclined seating mode illustrated in FIG. 4. In the dinette mode, however, the first seat back 122A is disposed along a first armrest 142A of the first seat assembly 112A. The first armrest 142A is disposed opposite the table assembly 114. Similarly, the second seat back 122B is disposed along a second armrest 142B of the second seat assembly 112B. The second armrest 142B is disposed opposite the table assembly 114. Due to the positioning of the first seat back 122A and the second seat back 122B, occupants seated on the seat bottoms 124A, 124B may face toward the table assembly 114 and each other. As such, the dinette mode illustrated in FIG. 6 may be more specifically referred to as a transverse-facing dinette seating mode.

Illustratively, the first seat back 122A and the second seat back 122B are detachable from the convertible furniture arrangement 100 to facilitate converting the arrangement 100 from the forward-facing seating modes to other modes, such as the dinette mode. In other embodiments, the first seat back 122A and the second seat back 122B are movably carried by the first seat bottom 124A and the second seat bottom 124B, respectively, to facilitate converting the arrangement 100 from the forward-facing seating modes to other modes, such as the dinette mode.

Figure 7:
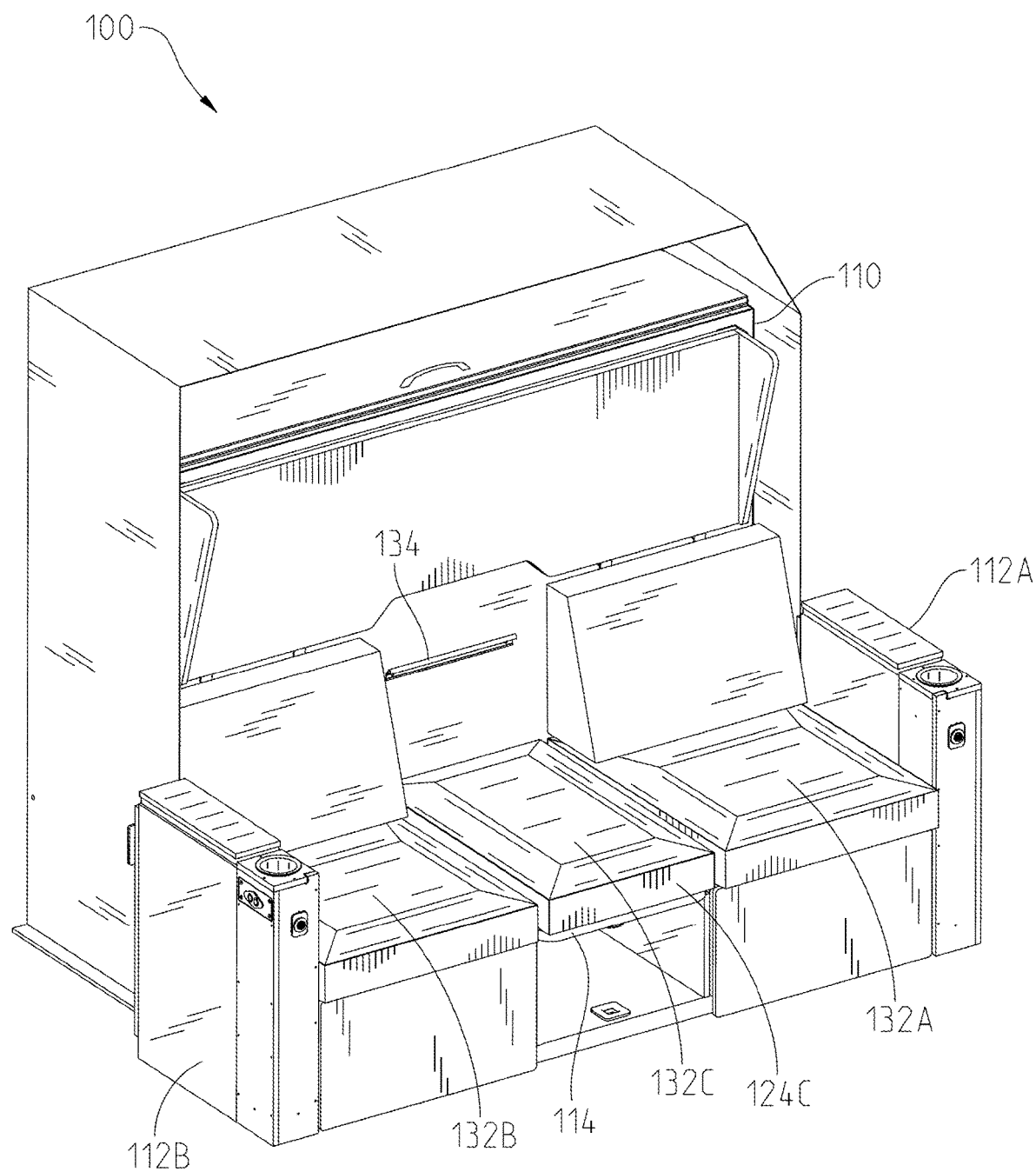
FIG. 7 illustrates a top perspective view of the convertible furniture arrangement of FIG. 1 in a sofa mode.
Figure 8:
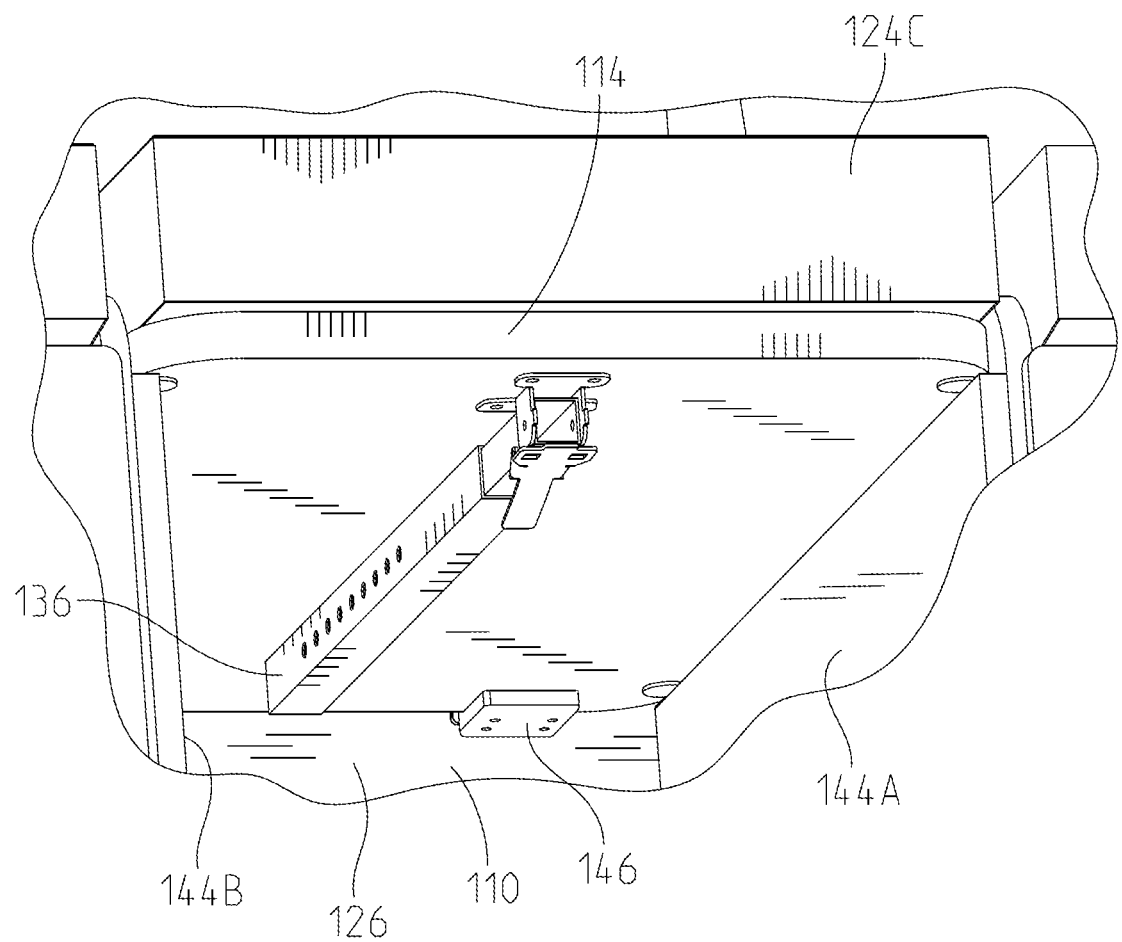
FIG. 8 illustrates a partial bottom perspective view of seat assemblies, a table assembly, and a bed assembly of the convertible furniture arrangement of FIG. 1 in the sofa mode.

FIGS. 7 and 8 illustrate the convertible furniture arrangement 100 in yet another forward-facing seating mode, more specifically a forward-facing sofa seating mode. In this mode, the first seat assembly 112A, the second seat assembly 112B, the bed assembly 110, and the table assembly 114 may generally be disposed as described above in connection with the non-reclined seating mode illustrated in FIG. 4. In this mode, however, the table assembly 114 is disposed in a lowered configuration. More specifically, the table assembly 114 is detached from the upper bracket 134 of the bed assembly 110, and, as shown in FIG. 8, the leg 136 is collapsed and folded under the table assembly 114. As also shown in FIG. 8, the table assembly 114 is also supported by a first support wall 144A of the first seat assembly 112A, a second support wall 144B of the second seat assembly 112B, and a lower bracket 146 carried by the base 126 of the bed assembly 110. The table assembly 114 carries a third seat bottom, or bottom cushion, 124C. In the sofa mode, the third seat bottom 124C may be substantially flush with the first seat bottom 124A and the second seat bottom 124B. Stated another way, the third seat bottom 124C has an upper or seating surface 132C, and in the sofa mode the third seating surface 132C is substantially coplanar with the first seating surface 132A of the first seat bottom 124A and the second seating surface 132B of the second seat bottom 124B (as used herein, "substantially coplanar" meaning parallel ±10 degrees and, if parallel, flush ±1 inch). Illustratively, the table assembly 114 and the third seat bottom 124C are manually manipulatable to convert the convertible furniture arrangement 100 to the sofa mode.

Figure 15:
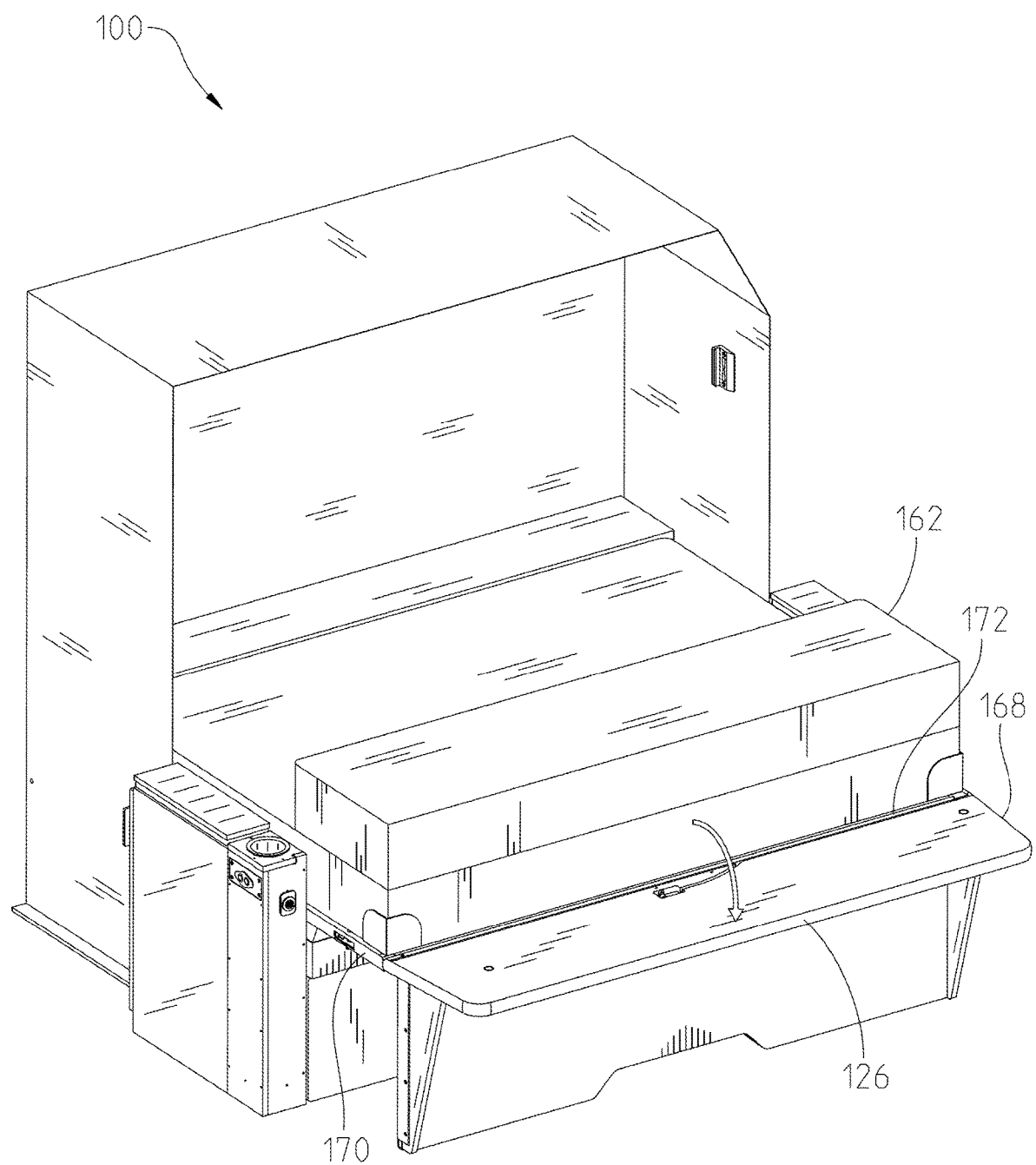
FIG. 15 illustrates a top perspective view of a fourth step for converting the furniture arrangement of FIG. 1 to the bed mode.
Figure 16:
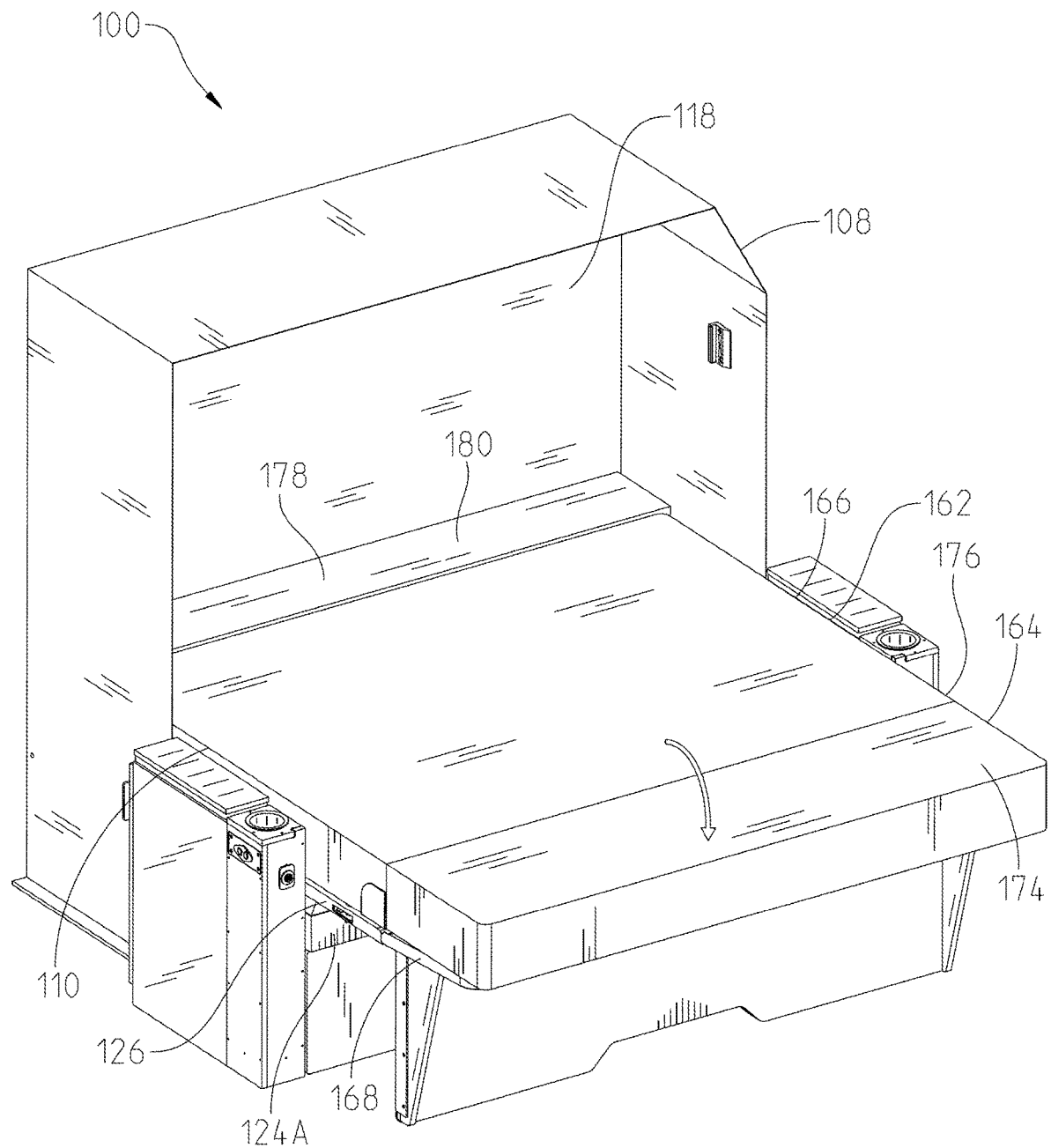
FIG. 16 illustrates a top perspective view of a fifth step for converting the furniture arrangement of FIG. 1 to the bed mode.
Figure 17:
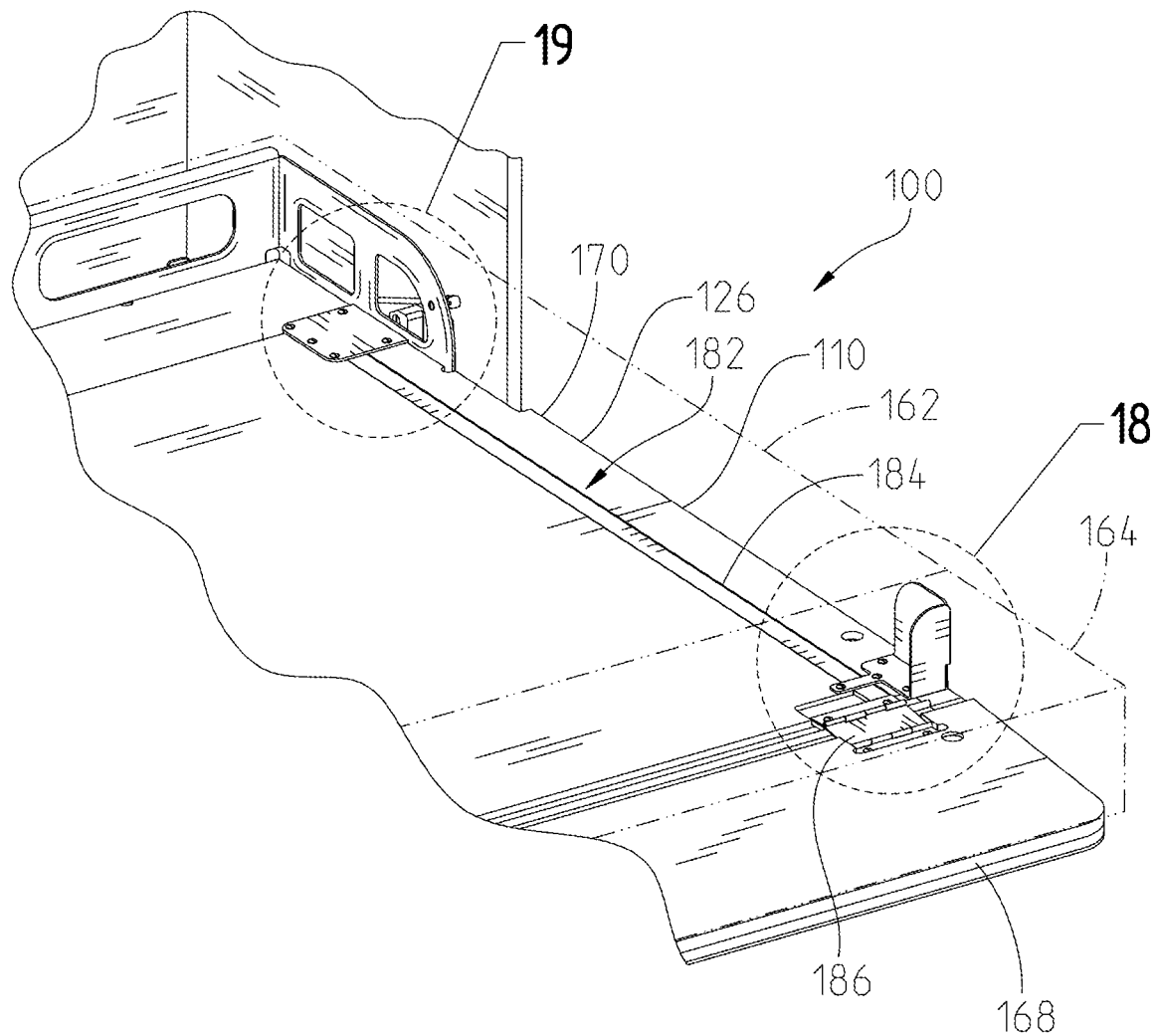
FIG. 17 illustrates a partial top perspective view of the convertible furniture arrangement of FIG. 1 in the bed mode; a mattress of the convertible furniture arrangement is hidden to illustrate a retainer.

FIGS. 9-17 illustrate actions for converting the furniture arrangement 100 from the forward-facing non-reclined seating mode to the bed mode, and FIG. 17 also illustrates the convertible furniture arrangement 100 in the bed mode. Illustratively, the bed assembly 110, the first and second seat assemblies 112A, 112B, and the table assembly 114 are manually manipulatable to convert the convertible furniture arrangement 100 to the bed mode.

Figure 9:
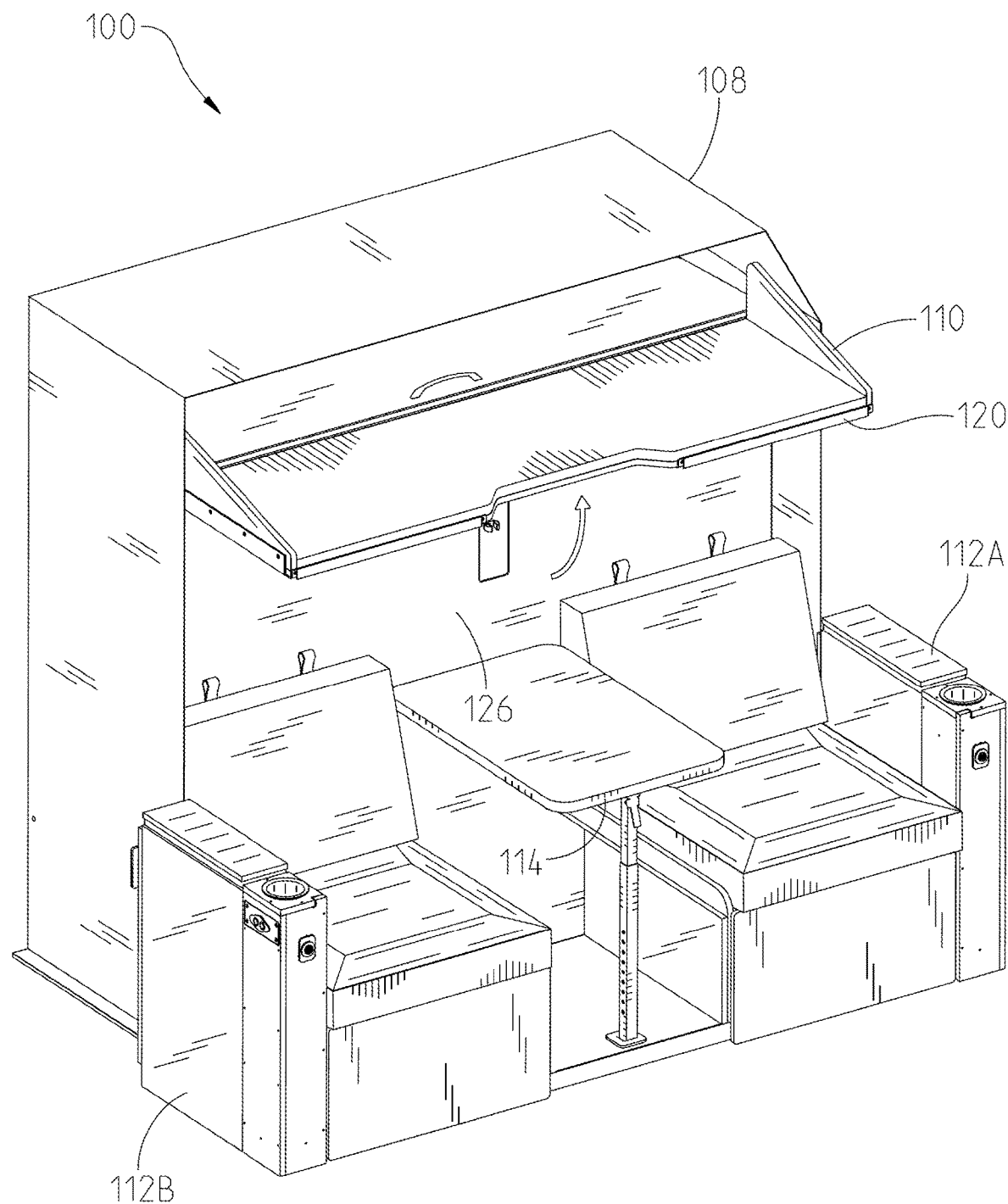
FIG. 9 illustrates a top perspective view of a first step for converting the furniture arrangement of FIG. 1 to the bed mode.
Figure 10:
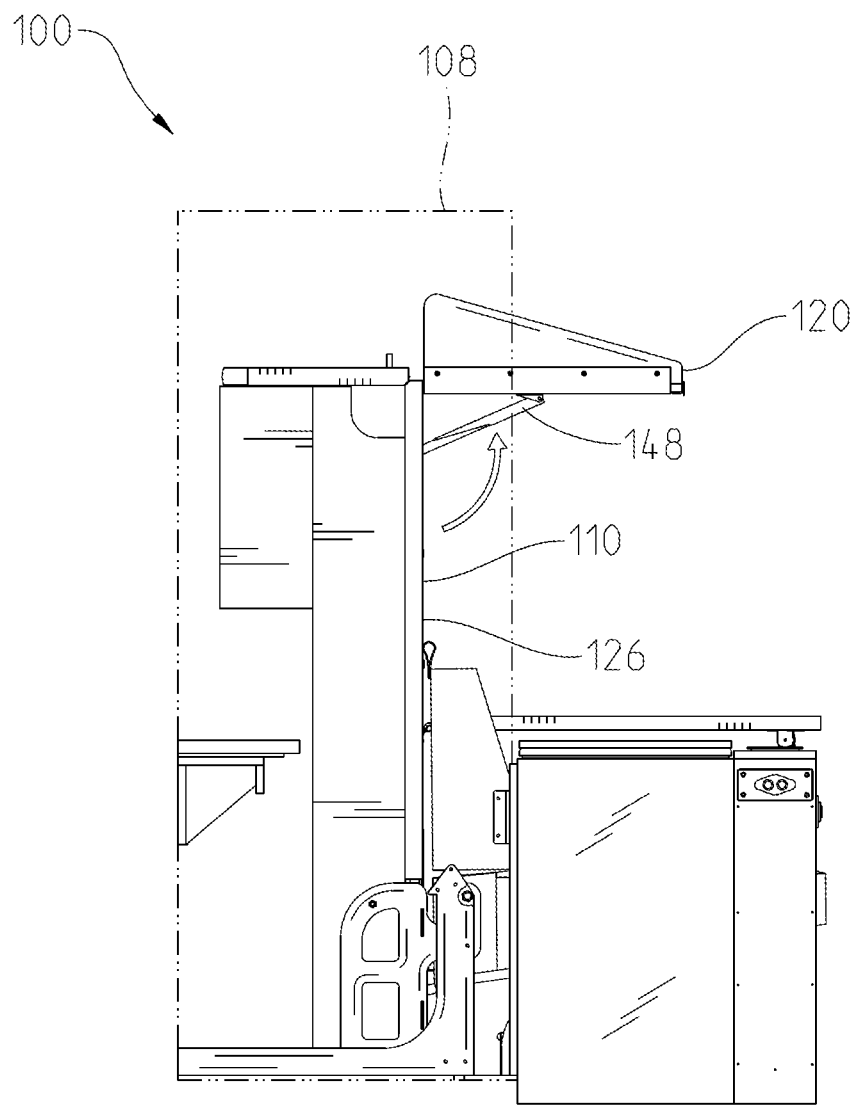
FIG. 10 illustrates a side view of the first step for converting the furniture arrangement of FIG. 1 to the bed mode; a slide-out structure of the convertible furniture arrangement is hidden to illustrate other features.
Figure 11:
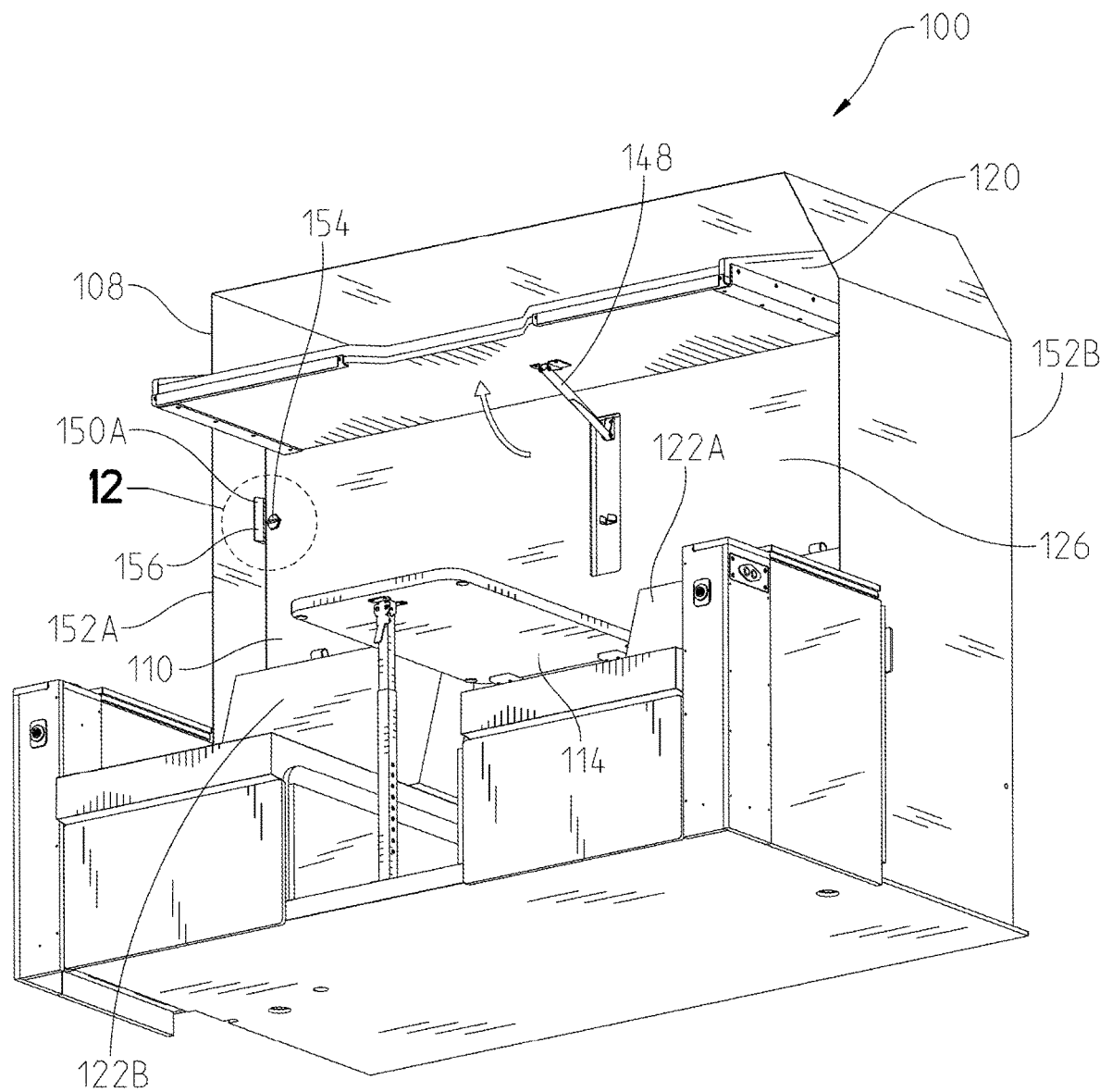
FIG. 11 illustrates a bottom perspective view of the first step and a second step for converting the furniture arrangement of FIG. 1 to the bed mode.

FIGS. 9-11 illustrate a first step for converting the furniture arrangement 100 to the bed mode. More specifically, FIG. 9-11 illustrate the support 120 of the bed assembly 110 being pivoted upwardly and away from the base 126 of the bed assembly 110. The support 120 thereby extends partially outwardly from the slide-out structure 108. As shown specifically in FIGS. 10 and 11, the support 120 may be held in this pivoted configuration via an extensible and pivotable arm 148 coupling the support 120 to the base 126. The support 120 may also pivotably couple to the base 126 via one or more hinges (not shown).

Figure 12:
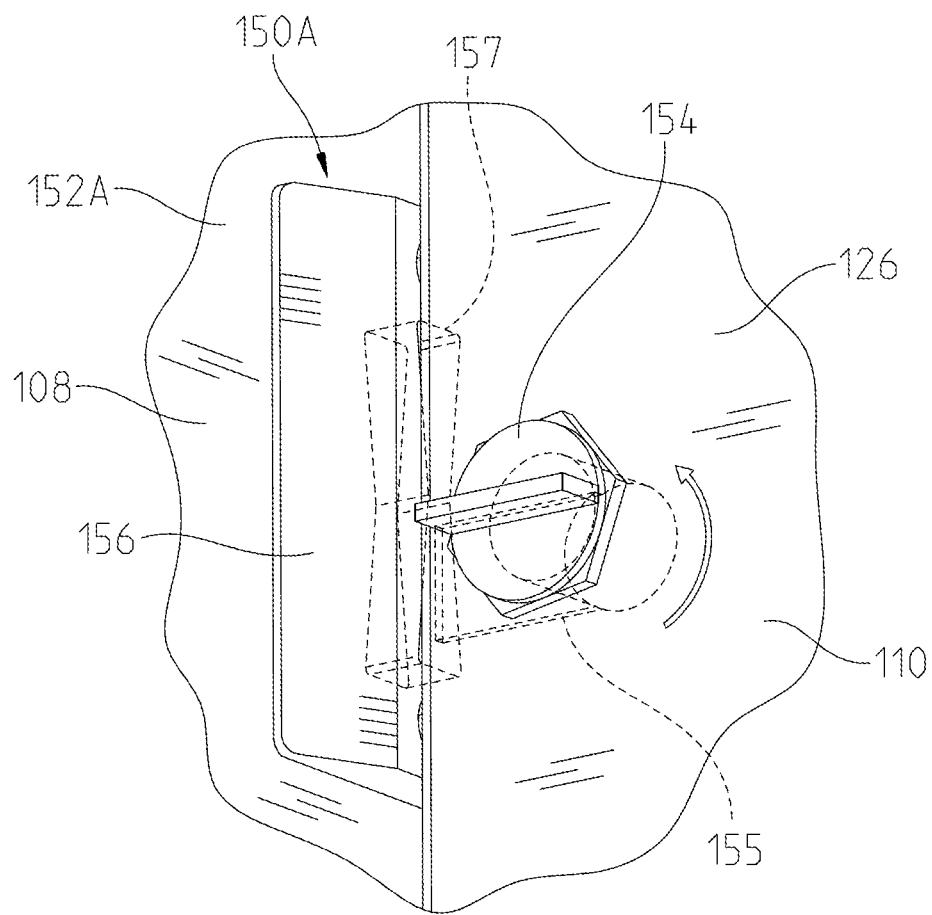
FIG. 12 illustrates a detail bottom perspective view of the area within line 12-12 of FIG. 11.

FIGS. 11 and 12 illustrate a second step for converting the furniture arrangement 100 to the bed mode. More specifically, FIGS. 11 and 12 illustrate release of a first latch 150A that selectively secures the base 126 of the bed assembly 110 to a first side wall 152A of the slide-out structure 108. Illustratively, the latch 150A includes a knob 154 that is pivotable carried by the base 126, a slidable bolt 155 (FIG. 12) operatively coupled to the knob 154, a strike plate 156 carried by the first side wall 152A, and a slot 157 (FIG. 12) formed in the strike plate 156 for selectively receiving the bolt 155. The knob 154 is pivotable relative to the base 126 to disengage the bolt 155 from the slot 157 of the strike plate 156. In other embodiments, the latch 150A may take any other form known in the art. The opposite side of the base 126 and a second side wall 152B of the slide-out structure 108 may carry a second latch (not shown), which may be the same as or different than the first latch 150A. Although not specifically illustrated, the second step also includes converting the table assembly 114 to its lowered configuration, detaching the first seat back 122A from the base 126 and moving the first seat back 122A away from the furniture arrangement 100, and detaching the second seat back 122B from the base 126 and moving the second seat back 122B away from the furniture arrangement 100.

Figure 13:
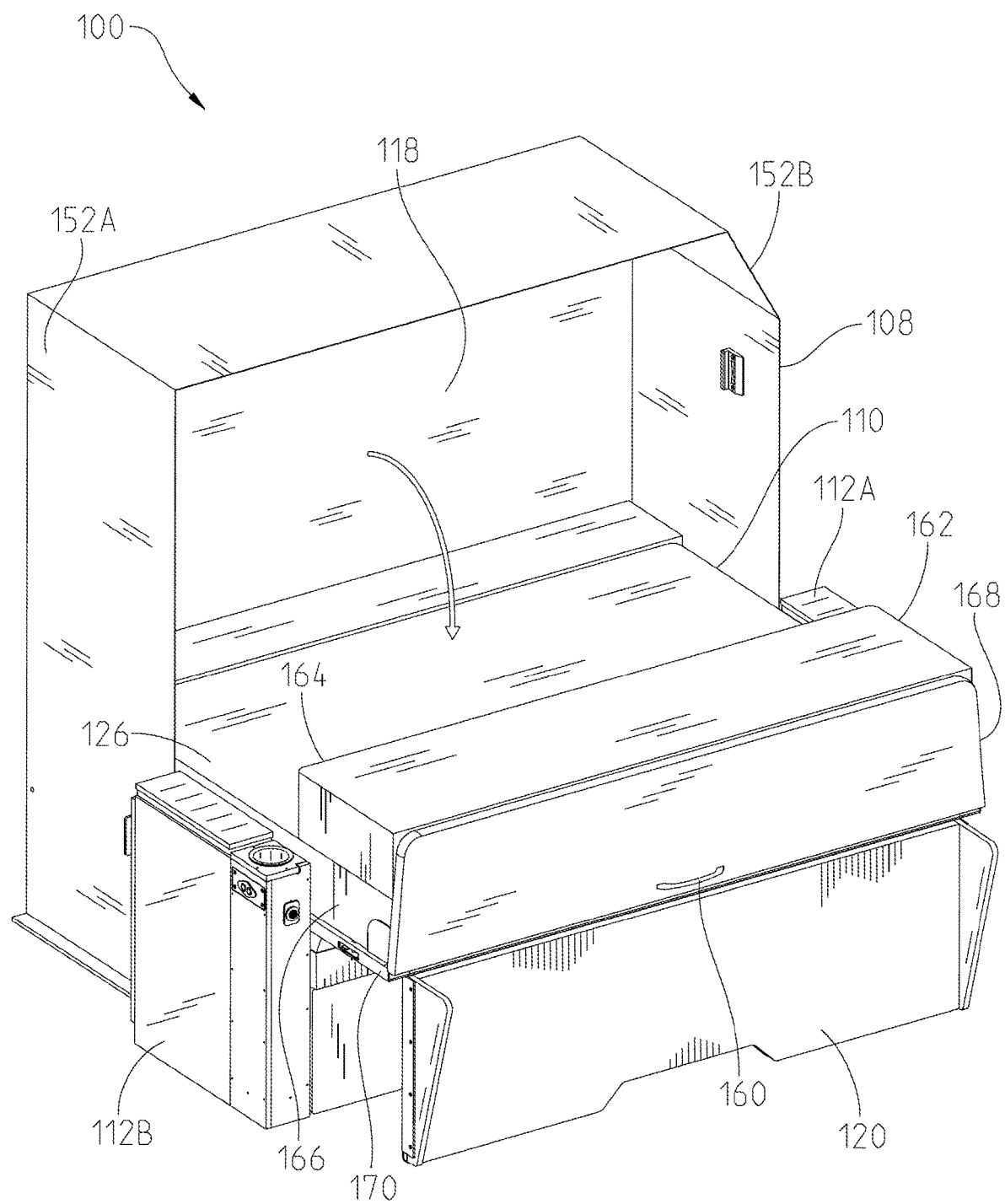
FIG. 13 illustrates a top perspective view of a third step for converting the furniture arrangement of FIG. 1 to the bed mode.
Figure 14:
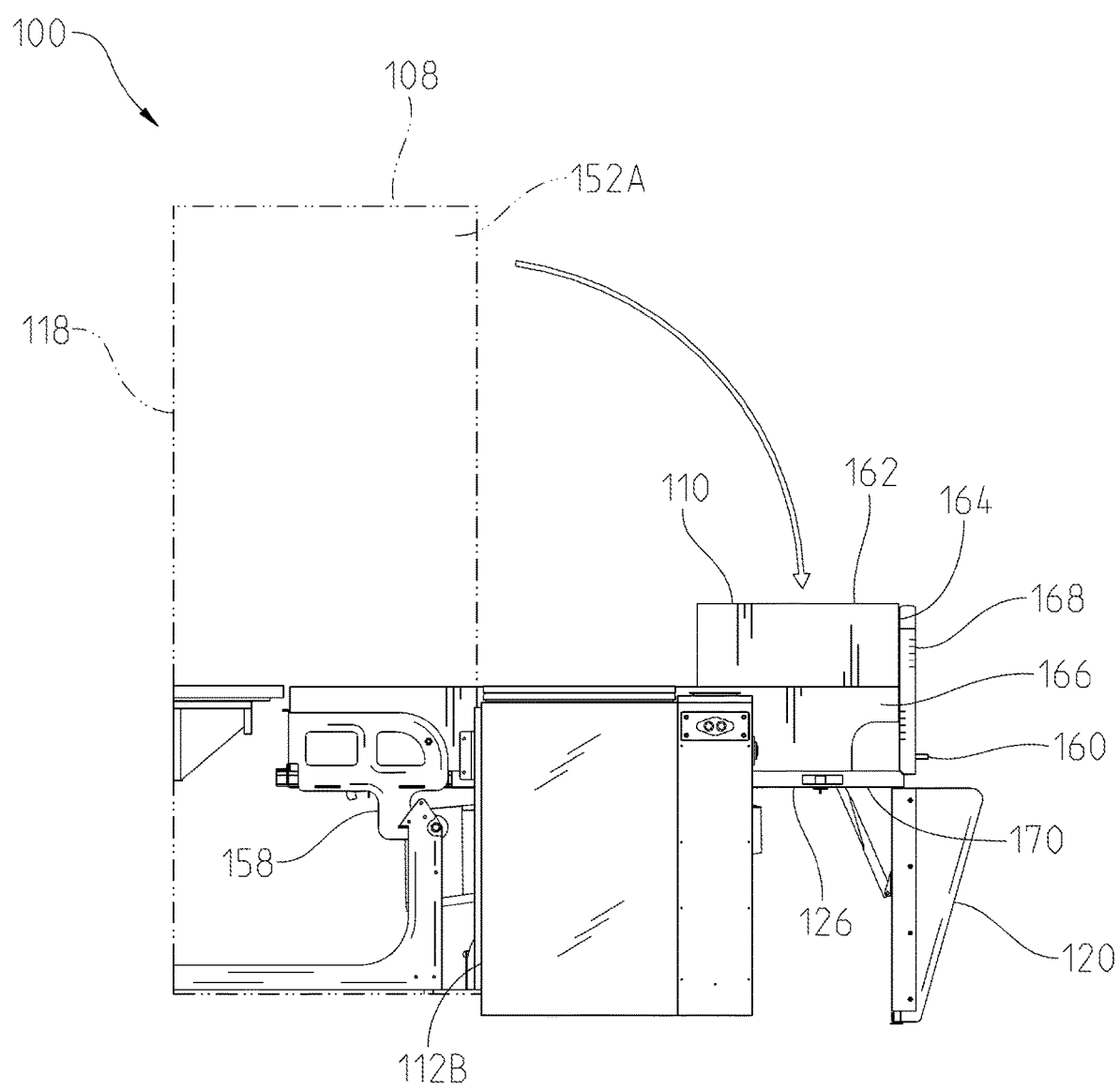
FIG. 14 illustrates a side view of the third step for converting the furniture arrangement of FIG. 1 to the bed mode; a slide-out structure of the convertible furniture arrangement is hidden to illustrate other features.

FIGS. 13 and 14 illustrate a third step for converting the furniture arrangement 100 to the bed mode. More specifically, FIGS. 13 and 14 illustrate the base 126 of the bed assembly 110 being pivoted downwardly, away from the rear wall 118 of the slide-out structure 108, and toward the first and second seat assemblies 112A, 112B. The base 126 pivotably couples to the first side wall 152A of the slide-out structure 108 via first pivot bracket 158 (FIG. 14) that is pivotably carried by the first side wall 152A. The base 126 also pivotably couples to the second side wall 152B (FIG. 13) of the slide-out structure 108 via second pivot bracket (not shown) that is pivotably carried by the second side wall 152B. Illustratively, the base 126 includes a handle 160 to facilitate pivoting the base 126 as described above.

In the configuration illustrated in FIGS. 13 and 14, the support 120 of the bed assembly 110 abuts the floor 104 of the living quarters 102 (shown elsewhere). In the configuration illustrated in FIGS. 13 and 14, a mattress 162 of the bed assembly 110 occupies a first or stacked configuration. More specifically, in the stacked configuration a movable foot portion 164 of the mattress 162 overlies a body portion 166 of the mattress 162. Additionally, in the configuration illustrated in FIGS. 13 and 14 the base 126 of the bed assembly 110 occupies a first or folded configuration. More specifically, in the folded configuration a pivotable secondary portion 168 of the base 126 is substantially perpendicular to a main portion 170 of the base 126 (as used herein, "substantially perpendicular" meaning perpendicular ±10 degrees). By being arranged in the folded configuration, the secondary portion 168 is disposed aside the foot portion 164 of the mattress 162 and inhibits the mattress 162 from moving from the stacked configuration.

FIG. 15 illustrates a fourth step for converting the furniture arrangement 100 to the bed mode. More specifically, FIG. 15 illustrates the secondary portion 168 of the base 126 being pivoted downwardly and away from the mattress 162 to arrive in a second or unfolded configuration. Illustratively, the secondary portion 168 pivotably couples to the main portion 170 via a hinge 172. In the unfolded configuration, the secondary portion 168 is substantially coplanar with the main portion 170. In the unfolded configuration, the secondary portion 168 permits the mattress 162 to move away from the stacked configuration, as described in further detail below.

FIG. 16 illustrates a fifth and final step for converting the furniture arrangement 100 to the bed mode. More specifically, FIG. 16 illustrates the foot portion 164 of the mattress 162 being moved away from the slide-out structure 108 and downwardly toward the secondary portion 168 of the base 126 to arrive in a second or unstacked configuration. In the unstacked configuration, an upper or laying surface 174 of the foot portion 164 is substantially coplanar with an upper or laying surface 176 of the body portion 166. In some embodiments, the foot portion 164 pivotably couples to the body portion 166 via one or more hinges (not shown) to facilitate moving the foot portion 164 to the unstacked configuration. In other embodiments, the foot portion 164 movably couples to the body portion 166 in other manners. For example, the foot portion 164 detachably couples to the body portion 166 and/or the secondary portion 168 of the base 126 (for example, via snap connectors, hook and loop fasteners, or the like—not shown). As another example, the foot portion 164 is received in a common flexible container (not shown) with the body portion 166, such as a fabric sheet or a plastic bag.

In the configuration illustrated in FIG. 16, or the bed mode, the bed assembly 110 overlies the first seat bottom 124A, the second seat bottom 124B (shown elsewhere), and the table assembly 114 (shown elsewhere). In the bed mode, the laying surface 174 of the foot portion 164 and the laying surface 176 of the body portion 166 are also substantially coplanar with an upper or laying surface 178 of a head portion 180 that is fixedly carried by the rear wall 118 of the slide-out structure 108. As a result, the body portion 166, the foot portion 164, and the head portion 180 are together suitable for supporting one or more occupants in laying postures.

Figure 18:
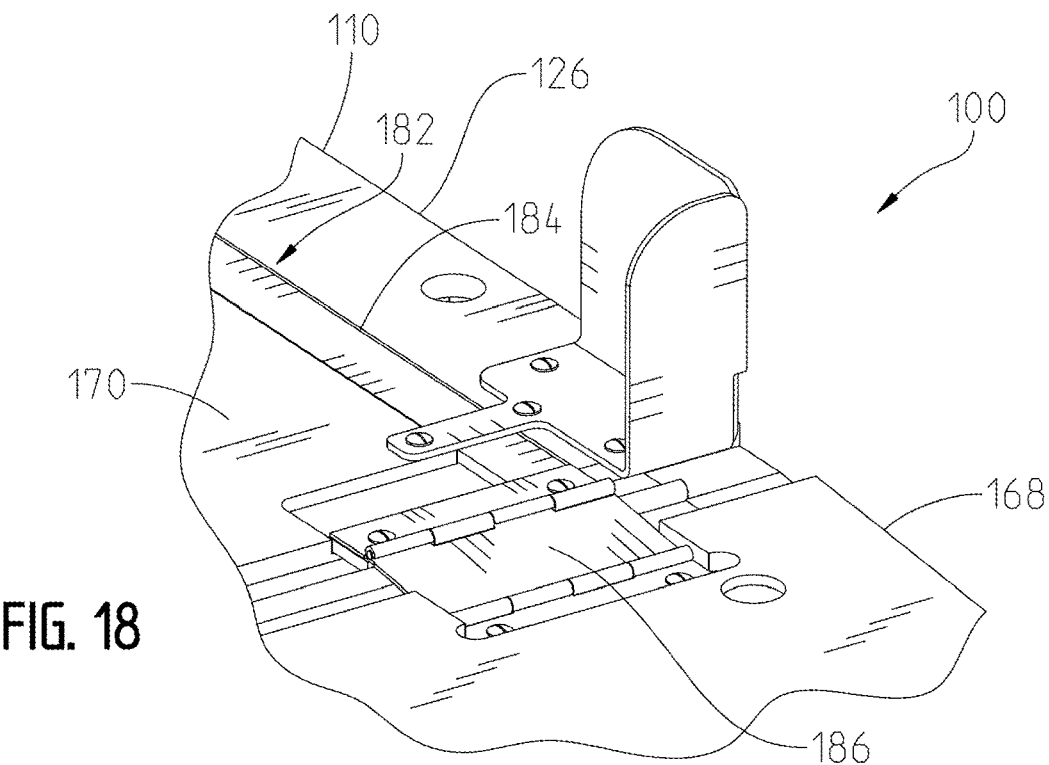
FIG. 18 illustrates a detail top perspective view of the area within line 18-18 of FIG. 17; a base of the bed assembly is illustrated in an unfolded configuration and the retainer is illustrated in a securing configuration.
Figure 19:
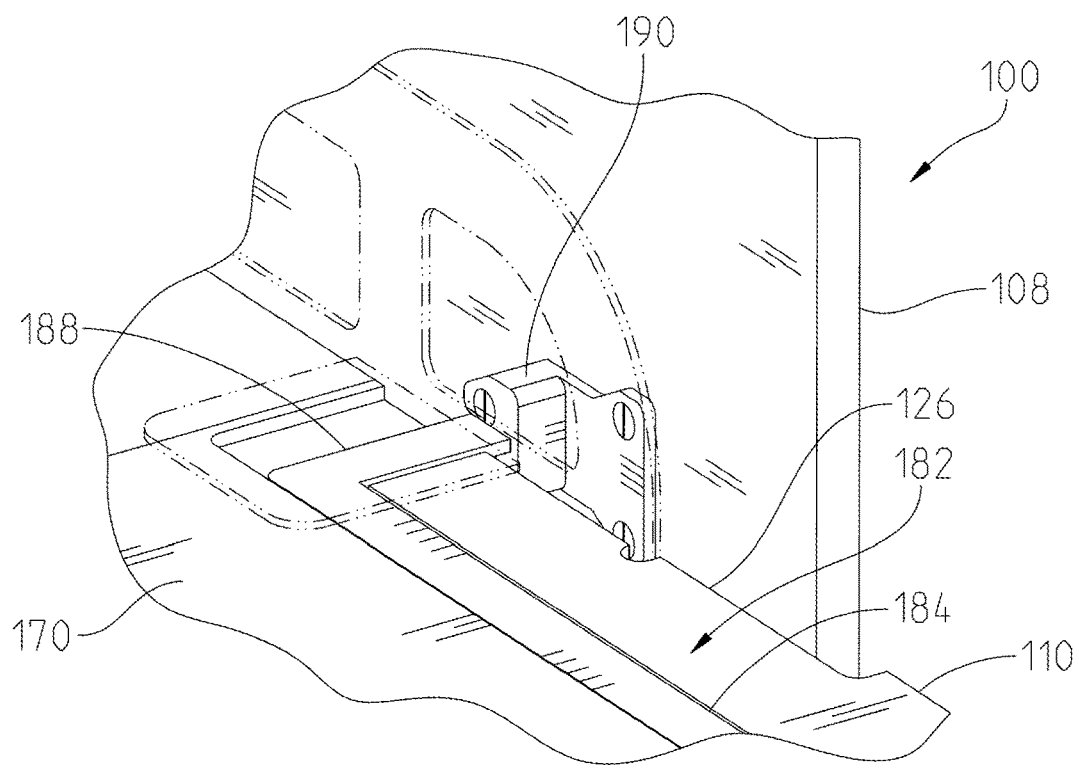
FIG. 19 illustrates a detail top perspective view of the area within line 19-19 of FIG. 17; the retainer is illustrated in the securing configuration.
Figure 20:
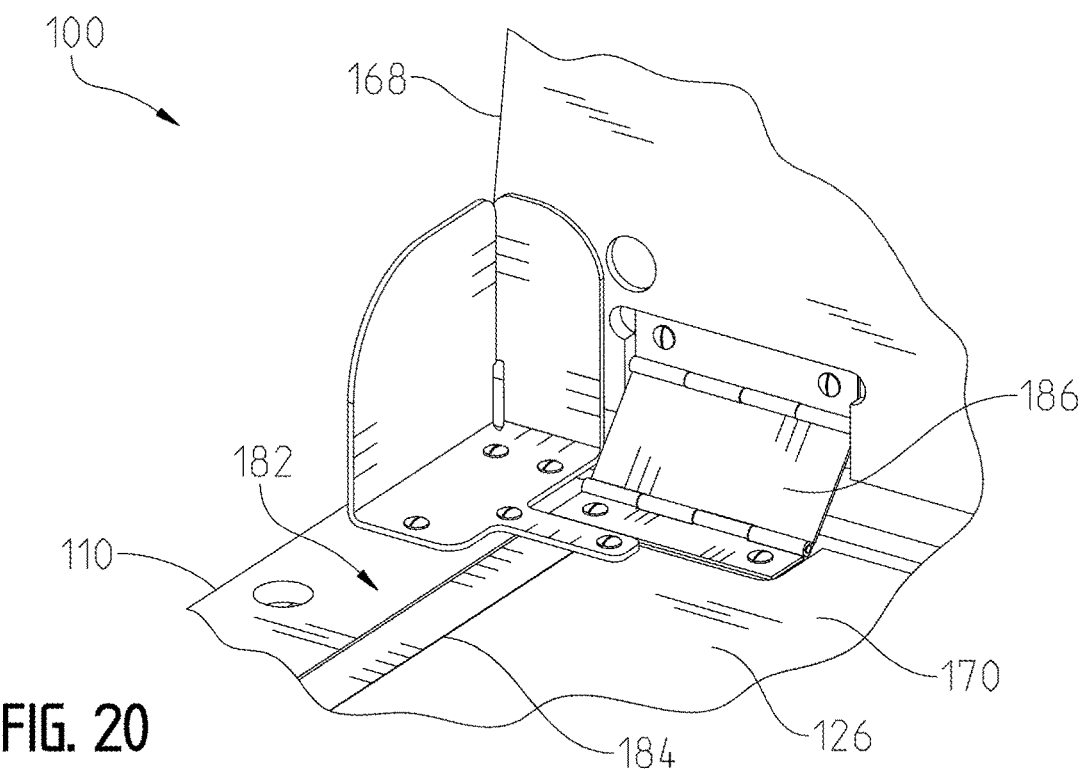
FIG. 20 illustrates a detail top perspective view similar to FIG. 18, except the base is illustrated in a folded configuration and the retainer is illustrated in a non-securing configuration.
Figure 21:
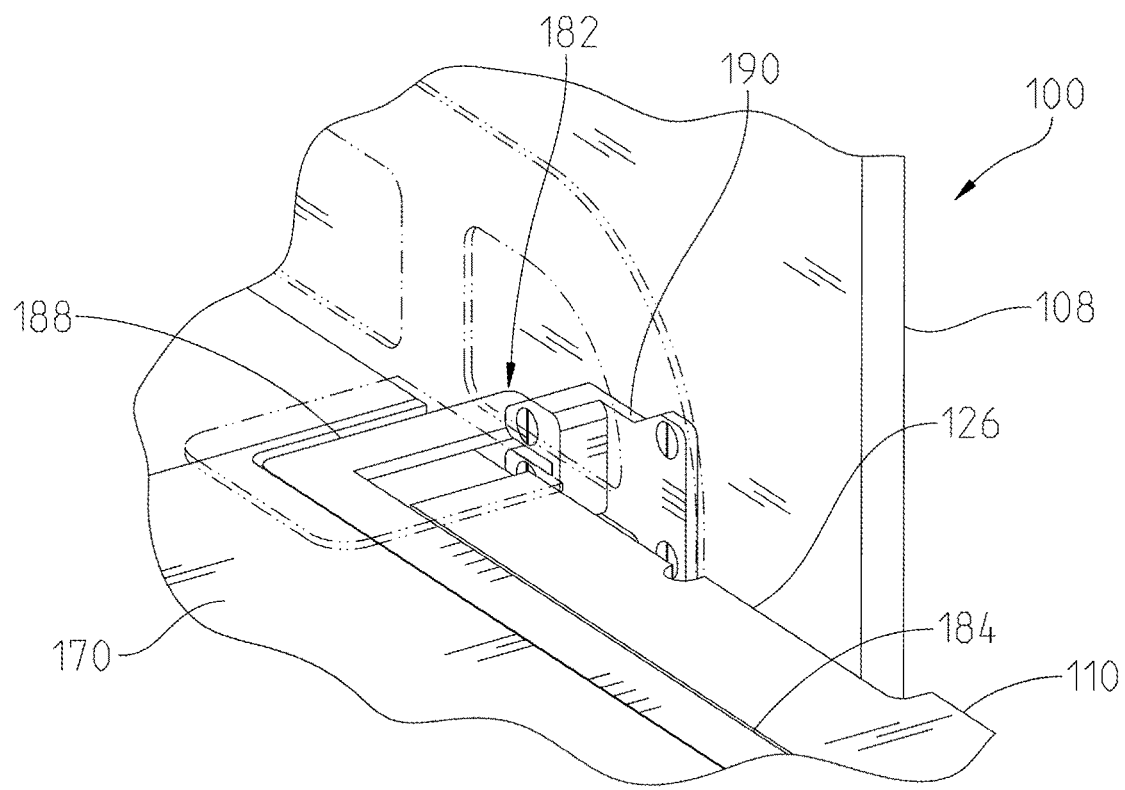
FIG. 21 illustrates a detail top perspective view similar to FIG. 19, except the retainer is illustrated in the non-securing configuration.

The convertible furniture arrangement 100 may additionally include one or more retainers for securing the arrangement 100 in one or more of the configurations described herein. For example and referring now to FIGS. 17-21, the convertible furniture arrangement 100 may include a retainer 182 that is generally disposed beneath the mattress 162. The retainer 182 is actuatable, or engagable, to inhibit the bed assembly 110 from converting from the bed mode to the seating mode. Illustratively, the retainer 182 includes an elongated leg 184 that is translatable relative to the main portion 170 of the base 126 of the bed assembly 110. The elongated leg 184 pivotably couples to the secondary portion 168 of the base 126 via a double hinge 186. As a result, the leg 184 translates relative to the main portion 170 as the secondary portion 168 of the base 126 pivots relative to the main portion 170—that is, as the base 126 is reconfigured from the unfolded configuration (FIG. 18) to the folded configuration (FIG. 20) and vice versa. As shown in FIG. 19, in the unfolded configuration a foot portion 188 of the leg 184 is received by a strike plate 190 carried by the slide-out structure 108. Engagement of the leg 184 with the strike plate 190 inhibits the base 126 from pivoting relative to the slide-out structure 108 or, more specifically, converting from the bed mode to a different mode. Stated another way, the retainer 182 occupies a securing configuration in the unfolded configuration of the base 126. As shown in FIG. 21, in the folded configuration the foot portion 188 of the leg 184 is disposed apart from the strike plate 190. As a result, the base 126 may pivot relative to the slide-out structure 108 or, more specifically, the base 126 may convert from the bed mode to a different mode. Stated another way, the retainer 182 occupies a non-securing configuration in the folded configuration of the base 126. In other embodiments, retainers may take other suitable forms.

Although not specifically illustrated, the convertible furniture arrangement 100 may also be converted to various combinations of the modes described above. For example, the convertible furniture arrangement 100 may be converted to one or more forward-facing partially-reclined seating modes. That is, the convertible furniture arrangement 100 may be converted to a forward-facing seating mode in which the first footrest 140A is elevated and the second footrest 140B is not elevated and/or a forward-facing seating mode in which the first footrest 140A is not elevated and the second footrest 140B is elevated. As another example, the convertible furniture arrangement 100 may be converted to one or more forward-facing, combined sofa and reclined seating modes. That is, the convertible furniture arrangement 100 may be converted to one or modes similar to the mode illustrated in FIGS. 7 and 8, but with the first footrest 140A of the first seat assembly 112A and/or the second footrest 140B of the second seat assembly 112B being elevated.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A convertible furniture arrangement for a living quarters comprising a wall and a floor, the convertible furniture arrangement comprising:
   a first seat assembly comprising a first seat bottom;
   a second seat assembly spaced apart from the first seat assembly, the second seat assembly comprising a second seat bottom;
   a bed assembly being pivotable relative to the first seat assembly and the second seat assembly, the bed assembly comprising:
      a base;
      a mattress supported by the base, the mattress comprising:
         a body portion comprising a first laying surface; and
         a foot portion being movable relative to the body portion, the foot portion comprising a second laying surface;
      wherein the mattress is convertible from a stacked configuration to an unstacked configuration, in the stacked configuration the foot portion overlying the body portion, in the unstacked configuration the second laying surface of the foot portion being substantially coplanar with the first laying surface of the body portion,
   wherein the convertible furniture arrangement is convertible from a seating mode to a bed mode, in the seating mode the bed assembly being disposed apart from the first seat assembly and the second seat assembly, and in the bed mode the bed assembly overlying the first seat bottom and the second seat bottom and the mattress being disposed in the unstacked configuration; and
   a support being pivotable relative to the bed assembly, in the seating mode the support being disposed above the first seat assembly and the second seat assembly, and in the bed mode the support being adapted to abut the floor.

2. The convertible furniture arrangement of claim 1, wherein the base comprises a main portion and a secondary portion being pivotable relative to the main portion from a folded configuration to an unfolded configuration, in the folded configuration the secondary portion being substantially perpendicular to the main portion, in the unfolded configuration the secondary portion being substantially coplanar with the main portion, and in the bed mode the base is disposed in the unfolded configuration.

3. The convertible furniture arrangement of claim 2, wherein in the folded configuration the secondary portion is disposed aside the foot portion and inhibits the mattress from converting from the stacked configuration to the unstacked configuration, and in the unfolded configuration the secondary portion permits the mattress to convert from the stacked configuration to the unstacked configuration.

4. The convertible furniture arrangement of claim 1, further comprising a table assembly being movable relative to the first seat assembly and the second seat assembly from an elevated configuration to a lowered configuration.

5. The convertible furniture arrangement of claim 4, wherein in the bed mode the table assembly is disposed in the lowered configuration and the bed assembly overlies the table assembly.

6. The convertible furniture arrangement of claim 4, further comprising a third seat bottom being supportable by the table assembly in the lowered configuration to provide the convertible furniture arrangement with a sofa mode.

7. The convertible furniture arrangement of claim 6, wherein the first seat bottom comprises a first seating surface, the second seat bottom comprises a second seating surface, the third seat bottom comprises a third seating surface, and in the sofa mode the third seating surface is substantially coplanar with the first seating surface and the second seating surface.

8. The convertible furniture arrangement of claim 1, wherein the first seat assembly further comprises a first seat back, the second seat assembly further comprises a second seat back, and the first seat back and the second seat back being detachable relative to the first seat bottom and the second seat bottom, respectively, to facilitate positioning the bed assembly over the first seat bottom and the second seat bottom in the bed mode.

9. The convertible furniture arrangement of claim 8, wherein the first seat back and the second seat back are movable relative to the first seat bottom and the second seat bottom, respectively, to provide the convertible furniture arrangement with a forward-facing seating mode and a transverse-facing seating mode.

10. The convertible furniture arrangement of claim 9, wherein the first seat back and the second seat back detachably couple to the base in the forward-facing seating mode.

11. A convertible furniture arrangement for a living quarters comprising a wall and a floor, the convertible furniture arrangement comprising:
   a slide-out structure adapted to move relative to the wall and the floor of the living quarters, the slide-out structure comprising a rear wall;
   a first seat assembly carried by the slide-out structure and comprising a first seat bottom;

a second seat assembly carried by the slide-out structure and spaced apart from the first seat assembly, the second seat assembly comprising a second seat bottom;
a bed assembly pivotably carried by the slide-out structure, the bed assembly comprising:
a base; and
a mattress supported by the base;
wherein the convertible furniture arrangement is convertible from a seating mode to a bed mode, in the seating mode the bed assembly being disposed between the first seat assembly and the rear wall and between the second seat assembly and the rear wall, and in the bed mode the bed assembly overlying the first seat bottom and the second seat bottom, and wherein the mattress comprises a body portion and a foot portion being movable relative to the body portion, the mattress being convertible from a stacked configuration to an unstacked configuration, in the stacked configuration the foot portion overlying the body portion, in the unstacked configuration a laying surface of the foot portion being substantially coplanar with a laying surface of the body portion, and in the bed mode the mattress being disposed in the unstacked configuration.

12. The convertible furniture arrangement of claim 11, wherein the base comprises a main portion and a secondary portion being pivotable relative to the main portion, the base being convertible from a folded configuration to an unfolded configuration, in the folded configuration the secondary portion being substantially perpendicular to the main portion, in the unfolded configuration the secondary portion being substantially coplanar with the main portion, and in the bed mode the base being disposed in the unfolded configuration.

13. The convertible furniture arrangement of claim 11, further comprising a support being pivotable relative to the bed assembly, in the seating mode the support being disposed above the first seat assembly and the second seat assembly, and in the bed mode the support being adapted to abut the floor.

14. The convertible furniture arrangement of claim 11, further comprising a table assembly being movable relative to the first seat assembly and the second seat assembly from an elevated configuration to a lowered configuration.

15. The convertible furniture arrangement of claim 14, wherein in the bed mode the table assembly is disposed in the lowered configuration and the bed assembly overlies the table assembly.

16. The convertible furniture arrangement of claim 11, wherein the first seat assembly further comprises a first seat back, the second seat assembly further comprises a second seat back, and the first seat back and the second seat back being detachable relative to the first seat bottom and the second seat bottom, respectively, to facilitate positioning the bed assembly over the first seat bottom and the second seat bottom in the bed mode.

17. The convertible furniture arrangement of claim 11, further comprising a head portion fixed relative to the rear wall, the head portion being disposed between the rear wall and the mattress.

18. The convertible furniture arrangement of claim 17, wherein in the bed mode a laying surface of the mattress is substantially coplanar with a laying surface of the head portion.

19. A convertible furniture arrangement for a living quarters comprising a wall and a floor, the convertible furniture arrangement comprising:
a first seat assembly comprising a first seat bottom;
a second seat assembly spaced apart from the first seat assembly, the second seat assembly comprising a second seat bottom;
a bed assembly being pivotable relative to the first seat assembly and the second seat assembly, the bed assembly comprising a base, the base comprising:
a main portion; and
a secondary portion being pivotable relative to the main portion;
wherein the base is convertible from a folded configuration to an unfolded configuration, in the folded configuration the secondary portion being substantially perpendicular to the main portion, in the unfolded configuration the secondary portion being substantially coplanar with the main portion, wherein the convertible furniture arrangement is convertible from a seating mode to a bed mode, in the seating mode the bed assembly being disposed apart from the first seat assembly and the second seat assembly, and in the bed mode the bed assembly overlying the first seat bottom and the second seat bottom and the base being disposed in the unfolded configuration, further comprising a slide-out structure adapted to move relative to the wall and the floor of the living quarters, the slide out structure carrying the first seat assembly, the second seat assembly, and the bed assembly.

20. The convertible furniture arrangement of claim 19, further comprising a table assembly being movable relative to the first seat assembly and the second seat assembly from an elevated configuration to a lowered configuration.

21. The convertible furniture arrangement of claim 20, wherein in the bed mode the table assembly is disposed in the lowered configuration and the bed assembly overlies the table assembly.

22. The convertible furniture arrangement of claim 19, further comprising a retainer coupled to the bed assembly, the retainer being engagable to inhibit the bed assembly from converting from the bed mode to the seating mode.

23. The convertible furniture arrangement of claim 22, wherein the retainer is engagable by converting the base from the folded configuration to the unfolded configuration.

24. The convertible furniture arrangement of claim 23, wherein the retainer comprises:
a leg being translatable relative to the main portion of the base and coupled to the secondary portion;
a strike plate configured to receive the leg when the base is configured in the unfolded configuration, the retainer thereby inhibiting the bed assembly from converting from the bed mode to the seating mode.

25. A convertible furniture arrangement for a living quarters comprising a wall and a floor, the convertible furniture arrangement comprising:
a first seat assembly comprising a first seat bottom;
a second seat assembly spaced apart from the first seat assembly, the second seat assembly comprising a second seat bottom;
a bed assembly being pivotable relative to the first seat assembly and the second seat assembly, the bed assembly comprising:
a base;
a mattress supported by the base, the mattress comprising:
a body portion comprising a first laying surface; and
a foot portion being movable relative to the body portion, the foot portion comprising a second laying surface;

wherein the mattress is convertible from a stacked configuration to an unstacked configuration, in the stacked configuration the foot portion overlying the body portion, in the unstacked configuration the second laying surface of the foot portion being substantially coplanar with the first laying surface of the body portion, wherein the convertible furniture arrangement is convertible from a seating mode to a bed mode, in the seating mode the bed assembly being disposed apart from the first seat assembly and the second seat assembly, and in the bed mode the bed assembly overlying the first seat bottom and the second seat bottom and the mattress being disposed in the unstacked configuration, and wherein the base comprises a main portion and a secondary portion being pivotable relative to the main portion from a folded configuration to an unfolded configuration, in the folded configuration the secondary portion being substantially perpendicular to the main portion, in the unfolded configuration the secondary portion being substantially coplanar with the main portion, and in the bed mode the base is disposed in the unfolded configuration.

26. The convertible furniture arrangement of claim 25, wherein in the folded configuration the secondary portion is disposed aside the foot portion and inhibits the mattress from converting from the stacked configuration to the unstacked configuration, and in the unfolded configuration the secondary portion permits the mattress to convert from the stacked configuration to the unstacked configuration.

27. A convertible furniture arrangement for a living quarters comprising a wall and a floor, the convertible furniture arrangement comprising:
a first seat assembly comprising a first seat bottom;
a second seat assembly spaced apart from the first seat assembly, the second seat assembly comprising a second seat bottom;
a table assembly being movable relative to the first seat assembly and the second seat assembly from an elevated configuration to a lowered configuration;
a bed assembly being pivotable relative to the first seat assembly and the second seat assembly, the bed assembly comprising:
a base;
a mattress supported by the base, the mattress comprising:
a body portion comprising a first laying surface; and
a foot portion being movable relative to the body portion, the foot portion comprising a second laying surface;
wherein the mattress is convertible from a stacked configuration to an unstacked configuration, in the stacked configuration the foot portion overlying the body portion, in the unstacked configuration the second laying surface of the foot portion being substantially coplanar with the first laying surface of the body portion, wherein the convertible furniture arrangement is convertible from a seating mode to a bed mode, in the seating mode the bed assembly being disposed apart from the first seat assembly and the second seat assembly, and in the bed mode the bed assembly overlying the first seat bottom and the second seat bottom and the mattress being disposed in the unstacked configuration.

28. The convertible furniture arrangement of claim 27, wherein in the bed mode the table assembly is disposed in the lowered configuration and the bed assembly overlies the table assembly.

29. The convertible furniture arrangement of claim 27, further comprising a third seat bottom being supportable by the table assembly in the lowered configuration to provide the convertible furniture arrangement with a sofa mode.

30. The convertible furniture arrangement of claim 29, wherein the first seat bottom comprises a first seating surface, the second seat bottom comprises a second seating surface, the third seat bottom comprises a third seating surface, and in the sofa mode the third seating surface is substantially coplanar with the first seating surface and the second seating surface.

31. A convertible furniture arrangement for a living quarters comprising a wall and a floor, the convertible furniture arrangement comprising:
a first seat assembly comprising a first seat bottom;
a second seat assembly spaced apart from the first seat assembly, the second seat assembly comprising a second seat bottom;
a bed assembly being pivotable relative to the first seat assembly and the second seat assembly, the bed assembly comprising:
a base;
a mattress supported by the base, the mattress comprising:
a body portion comprising a first laying surface; and
a foot portion being movable relative to the body portion, the foot portion comprising a second laying surface;
wherein the mattress is convertible from a stacked configuration to an unstacked configuration, in the stacked configuration the foot portion overlying the body portion, in the unstacked configuration the second laying surface of the foot portion being substantially coplanar with the first laying surface of the body portion, wherein the convertible furniture arrangement is convertible from a seating mode to a bed mode, in the seating mode the bed assembly being disposed apart from the first seat assembly and the second seat assembly, and in the bed mode the bed assembly overlying the first seat bottom and the second seat bottom and the mattress being disposed in the unstacked configuration, and wherein the first seat assembly further comprises a first seat back, the second seat assembly further comprises a second seat back, and the first seat back and the second seat back being detachable relative to the first seat bottom and the second seat bottom, respectively, to facilitate positioning the bed assembly over the first seat bottom and the second seat bottom in the bed mode.

32. The convertible furniture arrangement of claim 31, wherein the first seat back and the second seat back are movable relative to the first seat bottom and the second seat bottom, respectively, to provide the convertible furniture arrangement with a forward-facing seating mode and a transverse-facing seating mode.

33. The convertible furniture arrangement of claim 32, wherein the first seat back and the second seat back detachably couple to the base in the forward-facing seating mode.

34. A convertible furniture arrangement for a living quarters comprising a wall and a floor, the convertible furniture arrangement comprising:
a slide-out structure adapted to move relative to the wall and the floor of the living quarters, the slide-out structure comprising a rear wall;
a first seat assembly carried by the slide-out structure and comprising a first seat bottom;

a second seat assembly carried by the slide-out structure and spaced apart from the first seat assembly, the second seat assembly comprising a second seat bottom;
a bed assembly pivotably carried by the slide-out structure, the bed assembly comprising:
a base; and
a mattress supported by the base;
wherein the convertible furniture arrangement is convertible from a seating mode to a bed mode, in the seating mode the bed assembly being disposed between the first seat assembly and the rear wall and between the second seat assembly and the rear wall, and in the bed mode the bed assembly overlying the first seat bottom and the second seat bottom, wherein the base comprises a main portion and a secondary portion being pivotable relative to the main portion, the base being convertible from a folded configuration to an unfolded configuration, in the folded configuration the secondary portion being substantially perpendicular to the main portion, in the unfolded configuration the secondary portion being substantially coplanar with the main portion, and in the bed mode the base being disposed in the unfolded configuration.

35. A convertible furniture arrangement for a living quarters comprising a wall and a floor, the convertible furniture arrangement comprising:
a slide-out structure adapted to move relative to the wall and the floor of the living quarters, the slide-out structure comprising a rear wall;
a first seat assembly carried by the slide-out structure and comprising a first seat bottom;
a second seat assembly carried by the slide-out structure and spaced apart from the first seat assembly, the second seat assembly comprising a second seat bottom;
a bed assembly pivotably carried by the slide-out structure, the bed assembly comprising:
a base; and
a mattress supported by the base;
wherein the convertible furniture arrangement is convertible from a seating mode to a bed mode, in the seating mode the bed assembly being disposed between the first seat assembly and the rear wall and between the second seat assembly and the rear wall, and in the bed mode the bed assembly overlying the first seat bottom and the second seat bottom, further comprising a support being pivotable relative to the bed assembly, in the seating mode the support being disposed above the first seat assembly and the second seat assembly, and in the bed mode the support being adapted to abut the floor.

36. A convertible furniture arrangement for a living quarters comprising a wall and a floor, the convertible furniture arrangement comprising:
a slide-out structure adapted to move relative to the wall and the floor of the living quarters, the slide-out structure comprising a rear wall;
a first seat assembly carried by the slide-out structure and comprising a first seat bottom;
a second seat assembly carried by the slide-out structure and spaced apart from the first seat assembly, the second seat assembly comprising a second seat bottom;
a bed assembly pivotably carried by the slide-out structure, the bed assembly comprising:
a base; and
a mattress supported by the base;
wherein the convertible furniture arrangement is convertible from a seating mode to a bed mode, in the seating mode the bed assembly being disposed between the first seat assembly and the rear wall and between the second seat assembly and the rear wall, and in the bed mode the bed assembly overlying the first seat bottom and the second seat bottom, wherein the first seat assembly further comprises a first seat back, the second seat assembly further comprises a second seat back, and the first seat back and the second seat back being detachable relative to the first seat bottom and the second seat bottom, respectively, to facilitate positioning the bed assembly over the first seat bottom and the second seat bottom in the bed mode.

37. A convertible furniture arrangement for a living quarters comprising a wall and a floor, the convertible furniture arrangement comprising:
a first seat assembly comprising a first seat bottom;
a second seat assembly spaced apart from the first seat assembly, the second seat assembly comprising a second seat bottom;
a bed assembly being pivotable relative to the first seat assembly and the second seat assembly, the bed assembly comprising a base, the base comprising:
a main portion; and
a secondary portion being pivotable relative to the main portion;
wherein the base is convertible from a folded configuration to an unfolded configuration, in the folded configuration the secondary portion being substantially perpendicular to the main portion, in the unfolded configuration the secondary portion being substantially coplanar with the main portion, wherein the convertible furniture arrangement is convertible from a seating mode to a bed mode, in the seating mode the bed assembly being disposed apart from the first seat assembly and the second seat assembly, and in the bed mode the bed assembly overlying the first seat bottom and the second seat bottom and the base being disposed in the unfolded configuration, further comprising a table assembly being movable relative to the first seat assembly and the second seat assembly from an elevated configuration to a lowered configuration.

38. The convertible furniture arrangement of claim 37, wherein in the bed mode the table assembly is disposed in the lowered configuration and the bed assembly overlies the table assembly.

39. A convertible furniture arrangement for a living quarters comprising a wall and a floor, the convertible furniture arrangement comprising:
a first seat assembly comprising a first seat bottom;
a second seat assembly spaced apart from the first seat assembly, the second seat assembly comprising a second seat bottom;
a bed assembly being pivotable relative to the first seat assembly and the second seat assembly, the bed assembly comprising a base, the base comprising:
a main portion; and
a secondary portion being pivotable relative to the main portion;
wherein the base is convertible from a folded configuration to an unfolded configuration, in the folded configuration the secondary portion being substantially perpendicular to the main portion, in the unfolded configuration the secondary portion being substantially coplanar with the main portion, wherein the convertible furniture arrangement is convertible from a seating mode to a bed mode, in the seating mode the bed assembly being disposed apart from the first seat assembly and the second seat assembly, and in the bed mode the bed assembly overlying the first seat bottom and the second seat bottom and the base being disposed in the unfolded configuration, further comprising a retainer coupled to the bed assembly, the retainer being engagable to inhibit the bed assembly from converting from the bed mode to the seating mode.

40. The convertible furniture arrangement of claim 39, wherein the retainer is engagable by converting the base from the folded configuration to the unfolded configuration.

41. The convertible furniture arrangement of claim 40, wherein the retainer comprises:
- a leg being translatable relative to the main portion of the base and coupled to the secondary portion;
- a strike plate configured to receive the leg when the base is configured in the unfolded configuration, the retainer thereby inhibiting the bed assembly from converting from the bed mode to the seating mode.

* * * * *